US008319605B2

(12) United States Patent
Hassan et al.

(10) Patent No.: US 8,319,605 B2
(45) Date of Patent: Nov. 27, 2012

(54) REMOTE VEHICLE CONTROL SYSTEM UTILIZING MULTIPLE ANTENNAS

(75) Inventors: Hasib Hassan, Belleville, MI (US); John Lu, Grand Blanc, MI (US); Brian A. Gorman, Burton, MI (US); Alex Porat, Thornhill (CA)

(73) Assignee: Magna Electronics, Inc., Holland, MI (US)

( * ) Notice: Subject to any disclaimer, the term of this patent is extended or adjusted under 35 U.S.C. 154(b) by 341 days.

(21) Appl. No.: 12/790,898

(22) Filed: May 31, 2010

(65) Prior Publication Data

US 2010/0305779 A1  Dec. 2, 2010

Related U.S. Application Data

(63) Continuation-in-part of application No. 12/664,110, filed as application No. PCT/CA2008/001174 on Jun. 19, 2008.

(60) Provisional application No. 60/944,917, filed on Jun. 19, 2007, provisional application No. 60/992,134, filed on Dec. 4, 2007, provisional application No. 60/983,414, filed on Oct. 29, 2007, provisional application No. 60/983,403, filed on Oct. 29, 2007, provisional application No. 61/183,230, filed on Jun. 2, 2009.

(51) Int. Cl.
*B60R 25/00* (2006.01)

(52) U.S. Cl. ............. 340/5.72; 340/5.71; 340/5.32; 340/5.33; 340/10.2; 340/10.5; 340/13.31; 340/426.13; 340/447

(58) Field of Classification Search ............. 340/5.72, 340/5.71, 5.32, 5.33, 10.2, 10.5, 13.31, 426.13, 340/447
See application file for complete search history.

(56) References Cited

U.S. PATENT DOCUMENTS 6,243,022 B1  6/2001  Furukawa
6,308,083 B2  10/2001  King
(Continued)

FOREIGN PATENT DOCUMENTS

EP  1221684 A1  7/2002
(Continued)

OTHER PUBLICATIONS

European Search Report dated Mar. 7, 2012 from European Application No. 08772835.8, the European counterpart to U.S. Appl. No. 12/664,110, of which the present application is a continuation-in-part.

*Primary Examiner* — Tai T Nguyen
(74) *Attorney, Agent, or Firm* — Gardner, Linn, Burkhart & Flory, LLP

(57) ABSTRACT

A remote vehicle control system having a base transceiver mounted in a vehicle and a mobile key fob. The base transceiver utilizes an omni-directional antenna to communicate wirelessly with the key fob via the IEEE 802.15.4 communication protocol. Additional antennas are mounted to the vehicle and are also tuned to communicate over the IEEE 802.15.4 bandwidth. The additional antennas have radiation patterns extending outwardly to various sides of the vehicle (e.g., driver, passenger and rear sides). The system provides remote control functions and enables passive keyless entry functions such as unlocking doors or trunk latches by detecting the presence of the key fob proximate to one or more sides of the vehicle based on the ability of the key fob to communicate over IEEE 802.15.4 via the additional antennas.

18 Claims, 22 Drawing Sheets

U.S. PATENT DOCUMENTS

| | | |
|---|---|---|
| 6,420,967 B1 | 7/2002 | Ghabra et al. |
| 6,650,236 B2 | 11/2003 | Ghabra et al. |
| 6,738,712 B1 | 5/2004 | Hildebrant |
| 6,768,420 B2 | 7/2004 | McCarthy et al. |
| 6,943,666 B2 | 9/2005 | Mooney et al. |
| 7,042,342 B2 * | 5/2006 | Luo et al. ............. 340/426.17 |
| 7,109,852 B2 | 9/2006 | Gupte et al. |
| 7,145,507 B2 | 12/2006 | Luo et al. |
| 7,228,136 B2 | 6/2007 | Myllymaki et al. |
| 7,242,321 B2 | 7/2007 | New et al. |
| 7,301,442 B2 | 11/2007 | Kolpasky et al. |
| 7,388,466 B2 * | 6/2008 | Ghabra et al. ............ 340/5.61 |
| 7,999,654 B2 * | 8/2011 | Taki et al. .................. 340/5.64 |
| 2005/0099275 A1 | 5/2005 | Kamdar et al. |
| 2006/0049922 A1 | 3/2006 | Kolpasky et al. |
| 2006/0290518 A1 | 12/2006 | Bingle et al. |

FOREIGN PATENT DOCUMENTS

| | | |
|---|---|---|
| WO | WO00/77329 | 12/2000 |
| WO | 2006058098 A2 | 6/2006 |

* cited by examiner

REMOTE VEHICLE CONTROL SYSTEM UTILIZING MULTIPLE ANTENNAS

CROSS-REFERENCE TO RELATED APPLICATIONS

This application is a continuation-in-part of U.S. Ser. No. 12/664,110, filed Dec. 11, 2009, which is a §371 of PCT/CA2008/001174, filed Jun. 19, 2008 that claimed the benefit of U.S. 60/944,917, filed Jun. 19, 2007, and U.S. 60/992,134, filed Dec. 4, 2007, and U.S. 60/983,414, filed Oct. 29, 2007, and U.S. 60/983,403, filed Oct. 29, 2007. This application also claims the benefit of U.S. provisional application No. 61/183,230, filed Jun. 2, 2009.

FIELD OF INVENTION

The invention generally relates to wireless networks for use with vehicles, and more particularly the remote control of vehicle functions via a mobile control node such as a key fob or other mobile device.

BACKGROUND OF INVENTION

Many modern vehicles are equipped with key fobs that communicate, via radio, with a receiver in the vehicle to provide services such as remote keyless entry (RKE), remote starting, security and immobilizer functions, etc. Additional systems in the vehicle, such as tire pressure monitoring systems (TPMS) and passive keyless entry (PKE) may also use radio communications between transmitters and a receiver in the vehicle. It is not uncommon to have four or more radio transceivers, typically employing different frequencies and/or modulations, employed in modern vehicles to provide the variety of desired control functions. As will be apparent to those of skill in the art, the replication of radio transceivers and the provision of multiple antennas increases the costs of manufacturing the vehicle while still not providing for some of the functionality that may otherwise be desired.

SUMMARY OF INVENTION

A first aspect of the invention relates to a wireless communication system for a vehicle in which data for a variety of vehicular subsystems or functions are wirelessly communicated to a vehicle control system via a common communication protocol, thereby minimizing costs.

According to this aspect of the invention, a wireless communications system is provided for a vehicle which includes a transceiver processor unit (TPU) for mounting in the vehicle and a mobile control node such as a key fob, cell phone or other mobile device. The TPU includes: a first radio transceiver employing a single communication protocol to perform bi-directional data communications with at least two functional subsystems in the vehicle; a first processor connected to a vehicle control system and operable to receive and transmit data through the transceiver. The mobile control node includes: a second radio transceiver operable to perform bi-direction data communication with at least the TPU; a second processor operable to receive and transmit data through the second transceiver, and a user interface operable to receive input from a user to cause the processor to transmit, via the second transceiver and the first transceiver, a command to the vehicle control system.

Preferably, the two functional subsystems in the vehicle include at least one of a passive keyless entry system and a remote keyless entry system, and at least one of a tire pressure monitoring system and a remote starter system.

The preferred protocol is based on the IEEE 802.15.4/Zigbee standard (the disclosure of which is hereby incorporated herein by reference in its entirety). In the most preferred embodiments, a tire pressure monitoring system, an immobilizer, and a remote key fob which enables keyless entry or passive keyless entry functions, all utilize the preferred wireless communication protocol.

According to another aspect of the invention, a remote vehicle control system is provided which includes a base data processor and transceiver unit (base TPU) for mounting in a vehicle; a first substantially omni-directional antenna mounted to the vehicle and operatively coupled to the base TPU; a mobile device, the mobile device having a data processor and transceiver unit (mobile TPU), and a second antenna connected to the mobile TPU, where the base TPU and mobile device communicate wirelessly with one another via the IEEE 802.15.4 communication protocol; third and fourth antennas mounted to the vehicle that are tuned to communicate over the IEEE 802.15.4 bandwidth used for wirelessly communicating between the base TPU and the mobile device, wherein the third antenna has an operable radiation pattern extending proximate to a driver's side of the vehicle but substantially not to an opposite side thereof and the fourth antenna has an operable radiation pattern extending proximate to the opposite side of the vehicle but substantially not to the driver's side thereof; and wherein the base TPU provides driver and passenger passive keyless entry functions by detecting the presence of the mobile device proximate to the vehicle driver side or the vehicle opposite side based on the ability of the mobile device to communicate via the third and fourth antennas or by the quality of such communication.

Preferably, the base TPU enables the driver or passenger passive keyless entry functions (such as unlocking driver or passenger doors) by determining the range between the vehicle to the mobile device by utilizing the first antenna and allowing PKE functions if the detected range is less than a threshold distance.

In one embodiment, a switch is provided for selectively connecting the base TPU to any one of the first, third and fourth antennas. In this embodiment, the base TPU attempts to directly communicate with the mobile device via the third and fourth antennas.

In another embodiment, at least third and fourth additional TPUs are respectively connected to the third and fourth antennas. The additional TPUs are operatively connected to the base TPU and configured to establish wireless communication links with the mobile TPU. The TPU detects the presence of the mobile device proximate to the vehicle driver side or the vehicle opposite side by the ability of the third and fourth TPUs to establish wireless communication links with the mobile TPU or the quality of such communication links. In such an embodiment, the mobile TPU, base TPU, third TPU and fourth TPU form a wireless area network, where the base TPU functions as a network coordinator and the third and fourth TPUs function as full function nodes.

In either embodiment, the omni-directional antenna and the third & fourth antennas may be mounted in a common housing atop a roof of the vehicle. Or, the third and fourth antennas may be mounted at opposing longitudinal ends of an interior rearview mirror assembly. Or, the third antenna may be mounted to the driver side exterior rearview mirror assembly and the fourth antenna may be mounted to the opposite side exterior rearview mirror assembly.

The system may also have a fifth antenna tuned to communicate over the IEEE 802.15.4 bandwidth, wherein the fifth antenna has an operable radiation pattern extending substantially toward the rear of the vehicle but not to the front or sides thereof, the TPU unlocking a rear vehicular closure member upon detecting the presence of the mobile device proximate to the rear of the vehicle by the ability of the mobile device to communicate via the fifth antenna. Likewise, a sixth antenna tuned to communicate over the IEEE 802.15.4 bandwidth may be included, wherein the sixth antenna has an operable radiation pattern extending substantially within the interior of the vehicle but not external thereto, the TPU enabling a passive start function upon detecting the presence of the mobile device within the interior of the vehicle based on the ability of the mobile device to communicate via the fifth antenna.

Another aspect of the invention relates to a remote control system for a vehicle that includes a battery providing motive power for the vehicle and a battery charging subsystem that monitors the charge state of the battery whilst recharging. A base transceiver is mounted in the vehicle and is operatively connected to the battery charging subsystem. An electronic key fob is provided, the key fob having a transceiver and a display operatively connected to the transceiver. The base transceiver and the key fob communicate wirelessly with one another via an IEEE 802.15.4 communication protocol. The base transceiver periodically communicates the state of the battery charge to the key fob whilst the battery is connected to an electrical power outlet for recharging.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

In the following discussion a mobile control node in accordance with the present invention is generally referred to as a "key fob". While it is contemplated that a mobile control node in accordance with the preferred embodiment will, at least presently, most commonly be implemented as a key fob, the present invention is not so limited and the mobile control node can be implemented in a variety of ways including on a variety of mobile computing devices or other devices (which may not be associated with any keys) such as a cell phone and hence the term "key fob" is used herein merely as a generic term to describe a mobile control node.

This application incorporates by reference in its entirety United States Patent Application Publication No. US 2008/0117079, published May 22, 2008, entitled "Remote Starter for Vehicle". This publication describes, inter alia, a key fob system, which allows an operator to remotely control numerous vehicle functions and/or receive status information about the vehicle for display on a view screen incorporated in the key fob.

The conventional vehicle utilizes primarily four short-range RF based peer-to-peer wireless systems, such as Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the transponder card/key FOB and the receiver module through antennas embedded inside the door handles and a unidirectional high frequency communication from key FOB/transponder card to the receiver module. The Immobilizer system also typically uses a low frequency bidirectional communication between the key and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles were avoided in the prior art.

System Overview

The preferred embodiment minimizes cost by employing a wireless communication infrastructure for a vehicle in which data for some or all of the foregoing subsystems or functions are wirelessly communicated to a single vehicle control system interface by utilizing a common communication protocol having a common carrier frequency and modulation scheme. In addition, as a result of the use of a common communication protocol, the functionality of the vehicle may be extended to seamlessly interact with a variety of wireless area networks installed in fixed infrastructure, as discussed in greater detail below.

Figure 1:
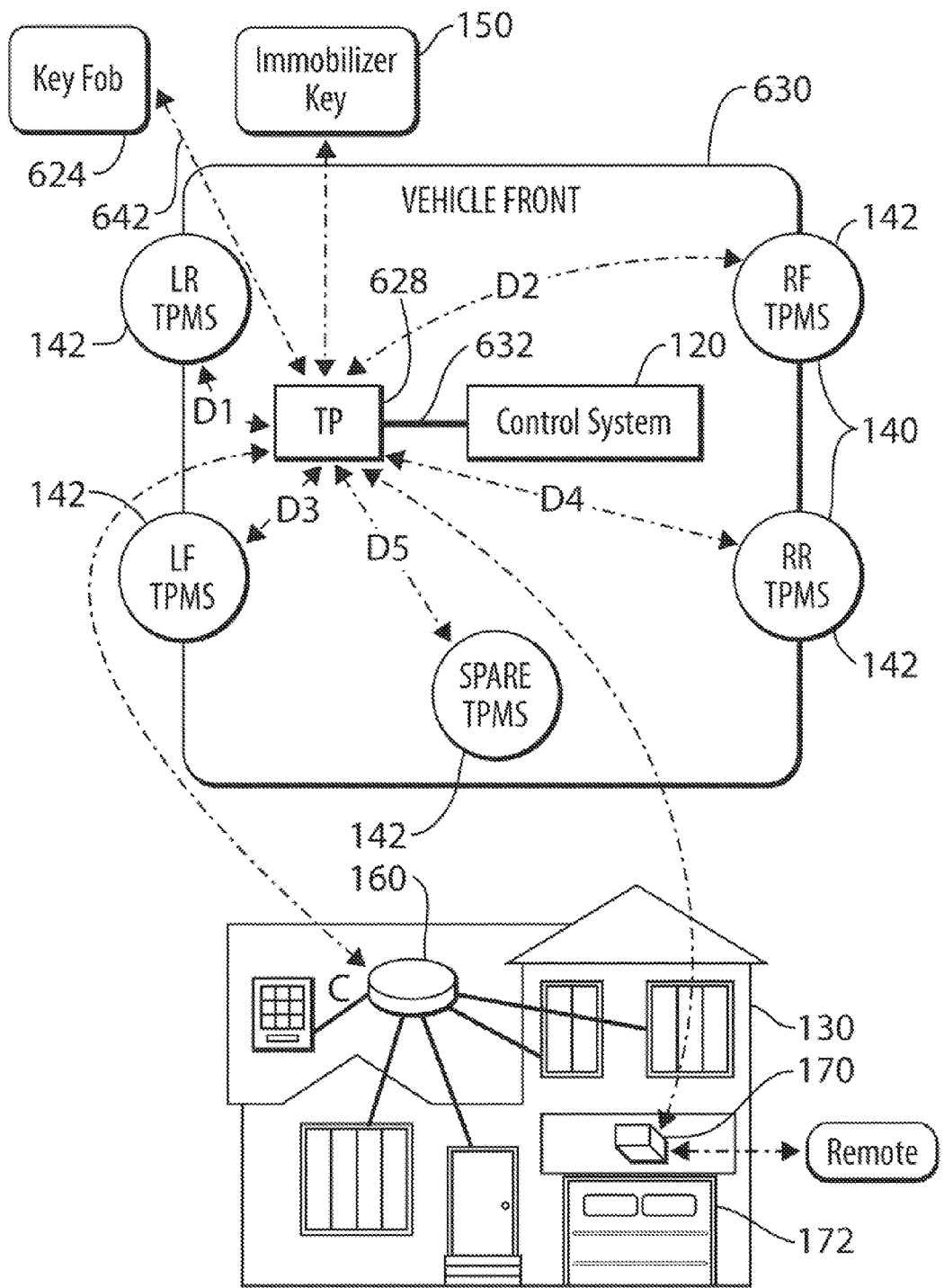
FIG. 1 shows a schematic diagram of a wireless communication system in accordance with a preferred embodiment.

FIG. 1 shows a wireless vehicular communication network 110 relative to a vehicle 630. As its base element, the network 110 includes a remote vehicle control (RVC) subsystem, alternatively referred to herein as a mobile control node system 620. As illustrated, subsystem 620 comprises a mobile control node, or key fob, 624 and a base transceiver/processor (TP) unit 628 which is installed in the vehicle 630.

TP unit 628 is electrically connected to necessary vehicle subsystems by a suitable connection 632. Preferably, the vehicle 630 in which TP unit 628 is installed includes a local control bus, such as a CAN Bus (i.e. Controller Area Network—ISO 11898/11519), which provides access to a vehicular control system 120. In this case, connection 632 preferably includes a bidirectional communication interface to the local control bus, in addition to any electrical power supply or other necessary connections for operation of TP unit 628, as will occur to those of skill in the art.

In the preferred embodiment, the network 110 and TP unit 628 implements the IEEE 802.15.4/Zigbee protocols and standard which are incorporated herein, in their entirety, by reference. While the invention is not limited to the use of the 802.15.4/Zigbee protocols, the low power, low cost benefits of such a protocol and standard are believed to offer numerous benefits. For example, one advantage of the IEEE 802.15.4 standard is that it typically has a communication range of 50 meters or thereabouts (about 5 to 500 meters depending on the environment and power consumption), which is considerably longer than the likes of the BLUETOOTH® standards (that typically is restricted to a range of about 10 meters). In addition, the IEEE 802.15.4 standard offers a choice of transmission frequencies. For example, it offers 16 channels in the worldwide, unlicensed, band of 2405-2480 MHz at data rates of 250 kbps. The protocol is also optimized for low duty-cycle applications (less than 0.1 percent), offers low power consumption (allowing battery life from months to years), supports multiple topologies (such as star, peer-to-peer, mesh and/or cluster topologies and/or the like), provides 64 bit addressing, and offers full hand-shaking for reliable data transfer. In addition, the preferred 802.15.4/Zigbee communication protocol includes collision handling and/or avoidance mechanisms, permitting a single carrier frequency or frequency band (which is established on initiation of vehicular wireless network) and a single modulation scheme to be employed amongst a variety of devices.

Thus, TP unit 628 is operable to establish and/or maintain a bidirectional data link 642 with one or more key fobs 624, as described in more detail below, utilizing the preferred communication protocol. Further, TP unit 628 is used to communicate with other wireless devices or subsystems in or associated with vehicle 630, utilizing the preferred communication protocol. These include a TPMS subsystem 140 and/or an immobilizer key 150. The key fobs 624 provide or support RKE and/or PKE functions. If desired the key fobs 624 can also provide an Immobilizer function, and function as a remote display for TPMS. The key fobs, with an appropriate user interface, can also provide a remote ignition start function and a whole host of other remote vehicle control or other customer features that are controlled via the key fob 624. The immobilizer key 150 can be used to provide the Immobilizer function instead of key fob 624. The immobilizer key 150 can also be used to implement the PKE function instead of key fob 624. As such, the immobilizer key 150 incorporates a wireless transceiver utilizing the preferred communication protocol, as discussed in greater detail below. The TPMS comprises a number of individual sensor units 142, each of which incorporate a wireless transceiver utilizing the preferred communication protocol, so as to communicate with the vehicle control system 120 via the TP unit 628.

Collectively, the one or more fobs 624, TPMS sensor units 142 and immobilizer key 150 are preferably arranged in a star topology where the TP unit 628 functions as the wireless area network coordinator, but it will be understood that other topologies may be implemented. For instance, the TPMS sensor units 142 may form their own local subnetwork, communicating with a central TPMS coordinator (that may be a sensor unit itself or a discrete device), in which case the wireless system as a whole will assume a tree topology.

The TP unit 628 may also be utilized as either a gateway (utilizing a different communication protocol) or more preferably as a local coordinator (utilizing the preferred Zigbee protocol) within an extended wireless area network associated with fixed infrastructure. For instance, FIG. 1 shows a house 130 which may be associated with one or more controllers, such as a home security system 160 and/or a garage door or security gate system 170, with which the vehicle 630 may interact. For instance, the vehicle key fob 624 may be utilized as an additional garage door or security gate actuator. Also, the vehicle 630 may become an object monitored by the home security system 160, where an unexpected withdrawal of the vehicle from the home security network may trigger an alarm.

In the preferred embodiment, the TP unit 628 provides location awareness in the sense that it is able to estimate the range or distance between it and another wireless transceiver that communicates with the unit 628. This is quite advantageous, enabling many functions to be controlled based on distance as an input parameter. For instance, the distance between the key fob 624 and the vehicle 630 may control the unlocking of vehicle doors for PKE. Similarly, in an expanded wireless area network, the estimated distance between the vehicle 630 and a garage door or security gate 172 may trigger the door or gate to automatically open, provided that other security and safety conditions are met.

Configuration of Base Transceiver Processor

Figure 2:
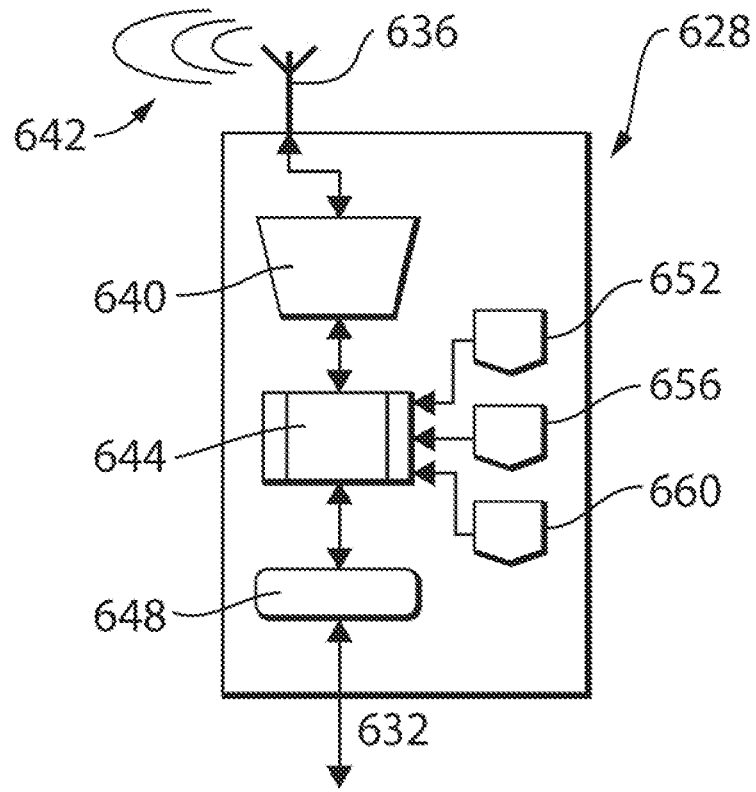
FIG. 2 shows a schematic representation of a transceiver processor unit for use with the system of FIG. 1.

A presently preferred configuration of TP unit 628 is illustrated schematically in FIG. 2. As illustrated, TP unit 628 includes at least one antenna 636 which is operatively connected to a radio transceiver 640. Each antenna 636 is located at an appropriate location on the vehicle in which TP unit 628 is installed and can be any suitable antenna structure including dipole, patch or microstrip structures.

TP unit 628 further includes a processor unit 644 which can perform various algorithmic and mathematical operations, as discussed below in more detail. While it is contemplated that sixteen bit processors, such as an S12XD processor, as manufactured by Freescale Semiconductor, 6501 William Cannon Drive, West, Austin, Tex., USA can be employed as processor unit 644, in a present embodiment of the invention, processor unit 644 is a thirty two bit processor, such as the V850ES/FG3 processor, manufactured by NEC Electronics Corporation, Kanagawa, Japan, and it includes both a program memory, which can be EPROM or Flash memory, and a data storage memory wherein at least some portion of the data storage memory is preferably a static memory. Processor unit 644 is connected to radio transceiver unit 640 to receive and/or transmit data over data link 642 as necessary.

An I/O interface 648 connects processor unit 644 to connection 632 which, as mentioned above, can be a CANBUS or other controller area network, or can be direct control connections to various subsystems in the vehicle in which TP unit 628 is installed. I/O interface can be an integrated part in processor unit 644, or can be a separate device as needed. Processor unit 644 can also be connected to various sensors, either directly (as shown in FIG. 2) or indirectly via connection 632, and such sensors can include an direction determining element such as electronic compass 652 (preferably a three-axis compass), an accelerometer 656 (preferably a three-axis accelerometer) and/or an inclinometer 660. The electronic compass may comprise a magneto-responsive sensor such as a hall-effect sensor, a flux-gate sensor, a magneto-resistive sensor, a magneto-inductive or a magneto-capacitive sensor. Suitable compass-direction sensors and associated compass sensing systems are disclosed in published US Patent Applications: 20080130149; 20080055757; 20060061008; and 20060164230, and in issued U.S. Pat. Nos. 7,331,115; 6,992,902; and 5,802,727 (the entire disclosures of which are hereby incorporated by reference herein in their entireties).

Figure 2A:
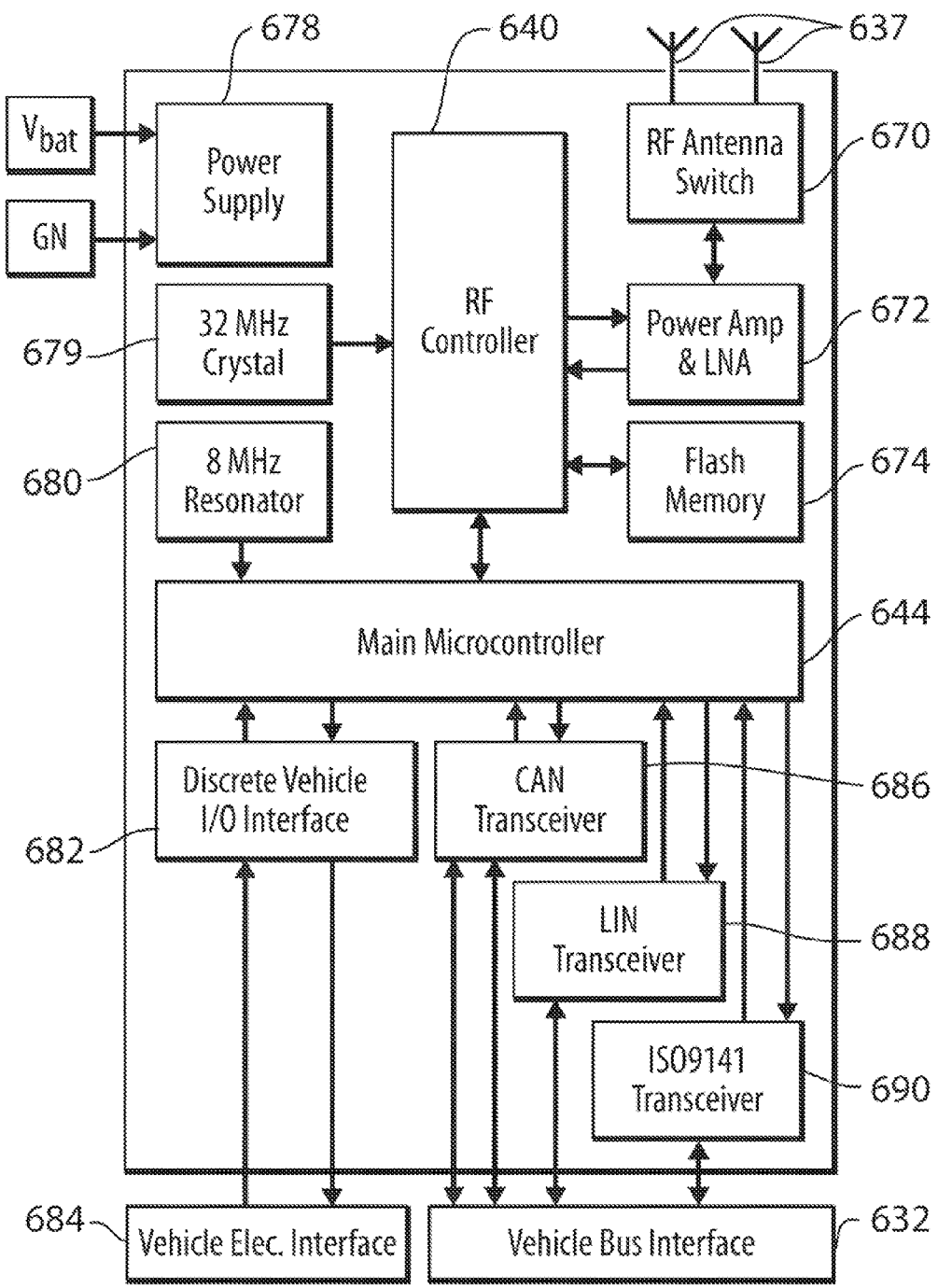
FIG. 2A is a system block diagram showing a preferred configuration of the transceiver processor unit.

FIG. 2A is a system block diagram showing a preferred configuration of the TP unit 628. This embodiment employs two Ghz antennas modules 637 that are coupled to an RF antenna switch. One antenna module is used for basic communication and range measurement with the key fob 624 and the other antenna module for close quarter locational mapping of the key fob 624 for advanced passive keyless entry functions, discussed in greater detail below. The antenna modules 637 are connected to a low noise amplifier (for amplification of received signals) and power amplifier (for amplification of transmitted signals) 672 controlled by the radio transceiver (or RF controller) 640. A crystal 679 provides the frequency for the RF controller internal clock signal. In this embodiment, an externally accessible flash memory 674 is connected to the RF controller 640.

The RC controller 640 is connected to the processor unit or main microcontroller 644. The microcontroller 644 is connected to CAN, LIN and ISO9141 transceivers 686, 688, and 690, which communicate over connection 32, the vehicle bus interface. In manufacture only one of the transceivers 686, 688 and 690 is likely to be employed at a given time.

A dc-to-dc converter 678, drawing power from the vehicle accessory battery, provides power to the various logic components and amplifier 672.

Configuration of Mobile Control Node/Key Fob

Figure 3:
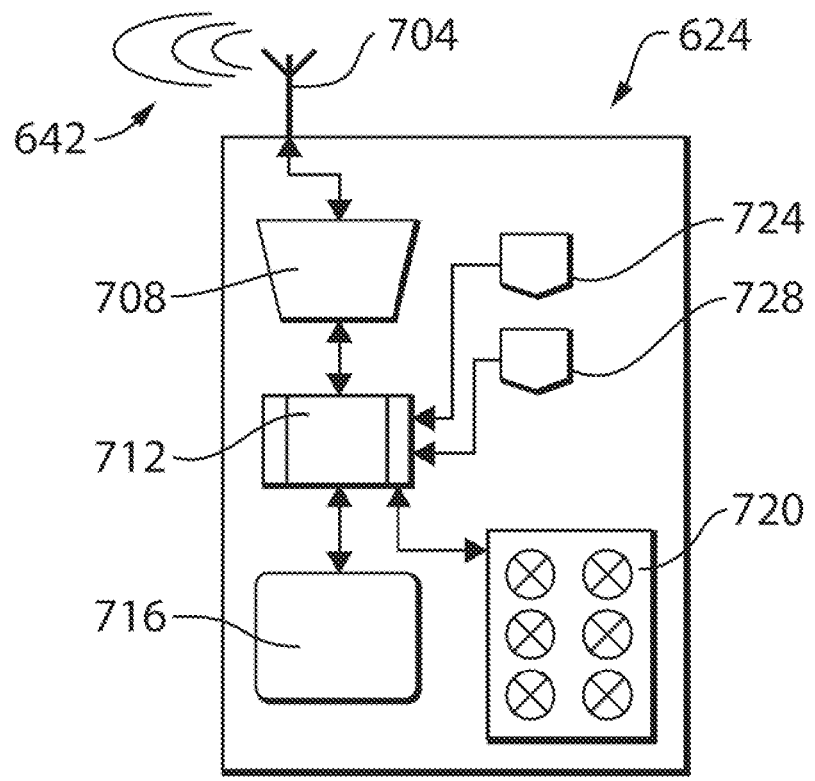
FIG. 3 shows a schematic representation of a mobile control node for use with the system of FIG. 1.

A preferred configuration of key fob or mobile control node 624 is illustrated schematically in FIG. 3. Control node 624 includes at least one antenna 704 and a radio transceiver 708 which is operable to establish and/or maintain a bidirectional data link 842 with radio transceiver 640 in a TP unit 628. Mobile control node 624 further includes a processor unit 712 which can perform various algorithmic and mathematical operations as discussed below in more detail. In a preferred embodiment, processor unit 712 can be a JN5139 or a JN 5147, manufactured by Jennic Ltd., Furnival Street, Sheffield S1 4QT, South Yorkshire, UK and it includes both a program memory, which can be EPROM or Flash memory, and a data storage memory wherein at least some portion of the data storage memory is preferably a static memory.

Transceiver unit 708 can be integral with processor unit 712, as is the case with the JN5139, or can be a separate device, as desired. In either case, processor unit 712 is connected to transceiver unit 708 to receive and/or transmit data over data link 642 as necessary. Mobile control node 624 further includes a user interface system connected to processor unit 712 and which preferably comprises at least a display 716 and a keypad 720.

In the illustrated embodiment, display 716 is a multi-pixel addressable display, such as an liquid crystal display (LCD) or an inorganic light emitting diode display or an organic light emitting display (OLED) or an E-ink display, and keypad 720 includes two or more user operable input keys. The display desirably may have some form of back lighting to enhance visibility or viewability of the displayed information in low lighting conditions. The display 716 is preferably "smart" enough to determine whether it is daytime or night time, such that back lighting may only be activated or lit when the surrounding lighting conditions are at or below a threshold level to save the battery life. For example, key fob or mobile control node 624 may comprise a photo sensor or photo sensors such as a photo transistor(s) or a photo diode(s) with associated light sensing circuitry such as is disclosed in U.S. Pat. No. 5,285,060 (the disclosure of which is hereby incorporated herein by reference in its entirety).

It is contemplated that display 716 can be a touch screen, in which case keypad 720 can be implemented via "soft keys" displayed on display 716. Alternatively, if keypad 720 is a physical set of keys, appropriate labels for one or more of the keys of keypad 720 can be displayed on display 716 allowing for the reassignment and reuse of the limited set of keys, as appropriate, for the current function of mobile control node 624.

Mobile control node 624 preferably further includes a distance determining element such as a pedometer or accelerometer 724 (preferably a three-axis accelerometer) and a direction determining element such as an electronic compass (preferably a three-axis compass) 728, each of which is operably connected to processor unit 712. These sensors are preferably employed to enable a vehicle locator function as discussed in greater detail below, but may also be used in isolation, for instance to provide a user compass or pedometer. In addition, the accelerometer 724 is useful to provide a signal to "wake" the mobile control node 624 from a period of inactivity when the node 724 may be in a low power consumption sleep mode.

Mobile control node 624 further includes a power supply (not shown) which can be an appropriate disposable battery, such as a lithium battery, or a rechargeable battery, such as a lithium ion or nickel metal hydride battery. In the latter case, mobile control node 624 will further comprise appropriate charging control circuitry. If the battery is rechargeable, it is desirable that it be recharged while driving the vehicle, as known in the art per se, such as by docking or otherwise connection of key fob or mobile control node 624 to a power source of the vehicle or, alternately, by power inductive-coupling of electrical power to the key fob or mobile control node 624 without a need to connect via wires or other physical direct connection.

Figure 3A:
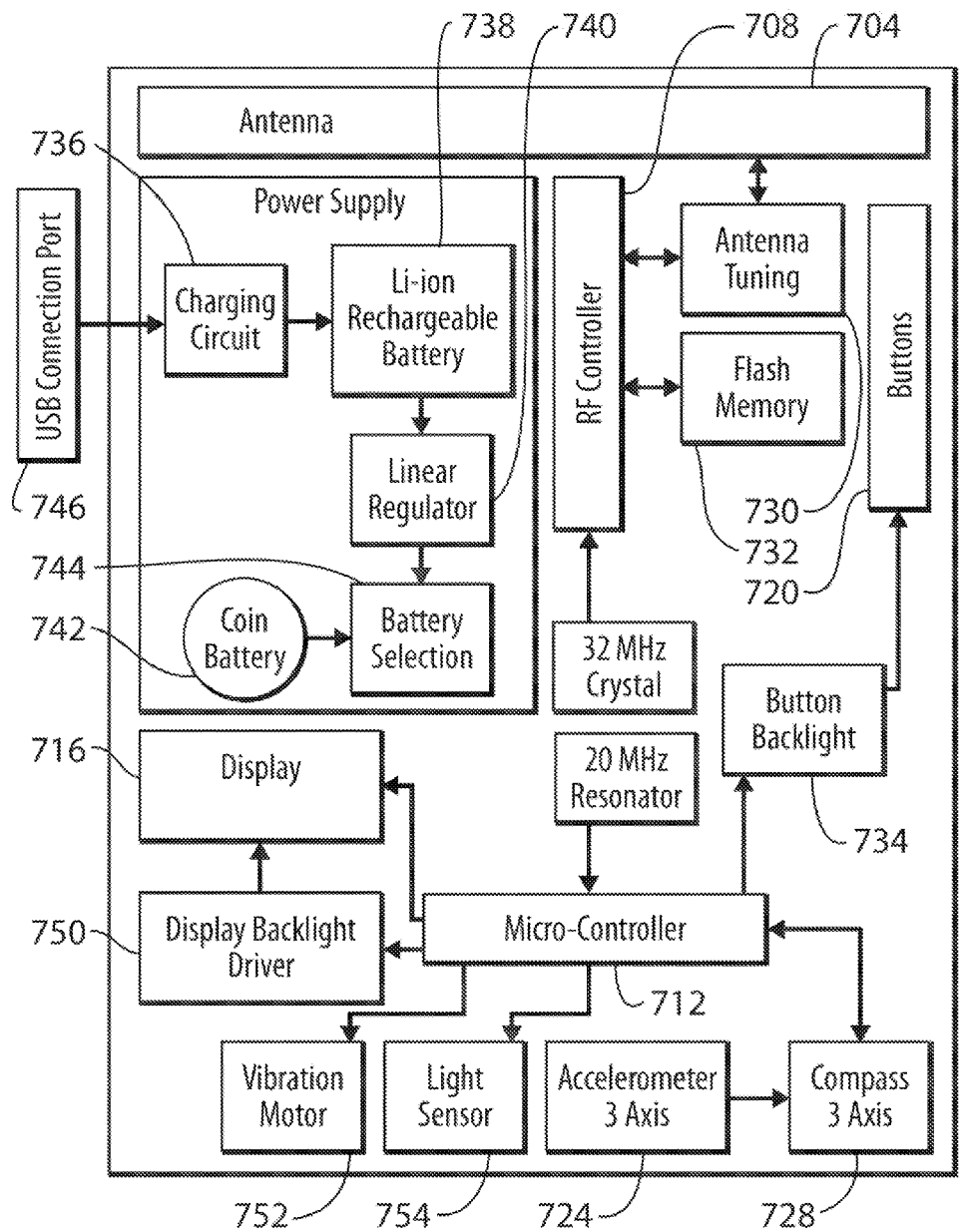
FIG. 3A is a system block diagram showing a preferred configuration of the mobile control node.

FIG. 3A is a system block diagram showing a preferred configuration of the mobile control node 624. The Ghz antenna 704 is connected to a tuning circuit 730, which in turn is connected to the RF transceiver (or RF controller) 708. A flash memory 732 is also connected to the RF transceiver 708. The RF transceiver 708 is connected the processor unit or microcontroller 712. The display 716, keypad 720, three-axis compass 734, three-axis accelerometer 724, a light sensor 754 and a vibration motor 752 are all operatively connected to the microcontroller 712. The light sensor 754 provides an input to the microcontroller 712 to control a backlight driver 750 that generates the backlighting intensity for LCD display 716 and the background color thereof. For example, when ambient light level is low, the display 716 may switch from a black-on-white to a white-on-black display, conserving power. Similarly, the light sensor 754 provides input to the microcontroller 712 to control backlighting 734 for the keypad 720. The vibration motor 752 is used to tactically signal the holder of the key fob by inducing vibrations in the device.

In the preferred configuration, power for the key fob is provided by either a rechargeable battery 738 or a coin battery 742, with the former being the preferred power source and the latter used when the output of the rechargeable battery 738 falls below a threshold state. A battery selection circuit 744 is provided for this purpose. The rechargeable battery 738 is connected upstream to a charging circuit 736 that utilizes a universal serial bus (USB) input connector. Downstream, a linear regulator 740 regulates the voltage provided the rechargeable battery 738.

Figure 3B:
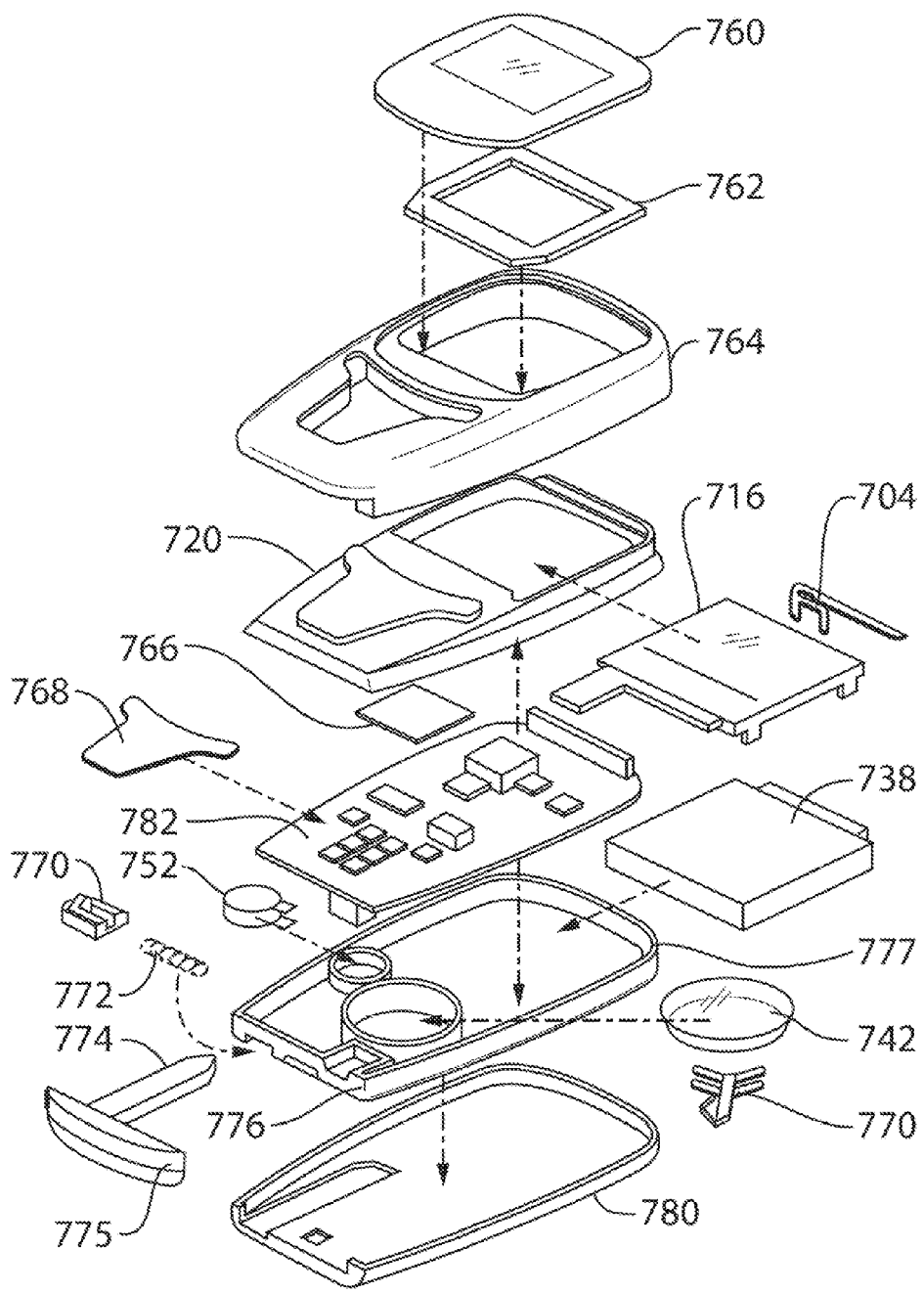
FIG. 3B is an exploded mechanical assembly view of the preferred mobile control node shown in FIG. 3A.
Figure 3C:
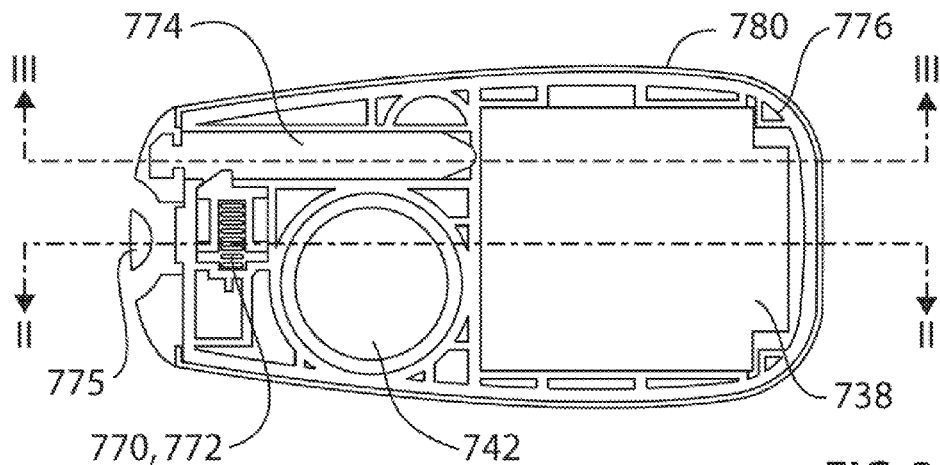
FIG. 3C is a horizontal cross-sectional view of the assembly shown in FIG. 3B.
Figure 3D:
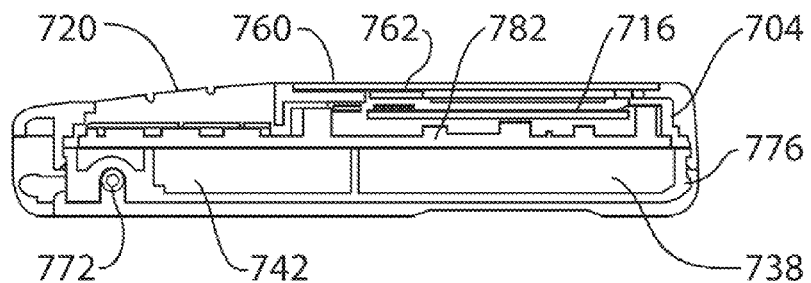
FIG. 3D is a vertical cross-sectional view of the assembly taken along line II-II in FIG. 3C.
Figure 3E:
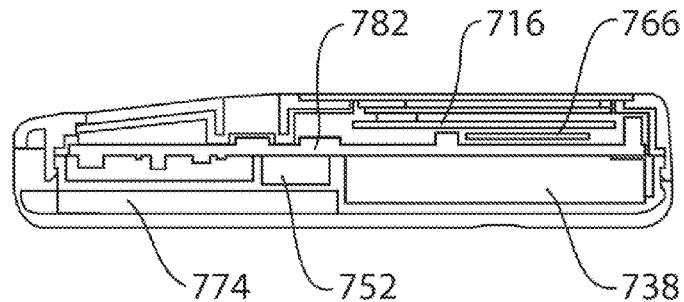
FIG. 3E is a vertical cross-sectional view of the assembly taken along line III-III in FIG. 3C.

FIG. 3B provides an exploded view of a mechanical assembly for the preferred mobile control node 624 shown in FIG. 3A. In the drawings, stippled lines represent component placement directives. FIG. 3C provides a horizontal cross-sectional view of the assembly; FIG. 3D provides a vertical cross-sectional view of the assembly along line II-II in FIG. 3C; and FIG. 3E provides a vertical cross-sectional view of the assembly along line III-III in FIG. 3C. Referring to these drawings the preferred mobile control node 624 includes a central frame 776 preferably formed from a strong and lightweight material such as aluminum. The frame is encased by plastic upper and lower covers or housing 764, 780. A decorated lens 760 is installed into a window in the upper housing 764 via a gasket 762. The upper housing 764 seats the keypad 720, which also provides the function of a resilient gasket or shield.

The LCD screen 716 is mounted to a printed circuit board (PCB) 782 which mounts all of the circuit components such as the transceiver and microcontroller. The antenna 704, is also mounted to the PCB 782, as are an EMI shield 766 and a backlighting mat 768 for diffusing light from LEDs mounted on the PCB 782. The PCB assembly sits between an outer flange 777 of frame 776 and the upper housing 764, covered by keypad/shield 720.

Underneath the PCB 720 the frame 776 has compartments for seating the rechargeable battery 738, coin battery 742 and battery connector 778, and vibrator 752. The frame 776 also has a compartment (between frame 776 and lower housing 780) for storing a backup mechanical key 774 with an overmolded key head 775. The key 774 is released from its compartment by a key release button 770 that is actuated by a preloaded spring 772 fitted into another compartment underneath the frame 776.

Configuration of Other Devices

Figure 7:
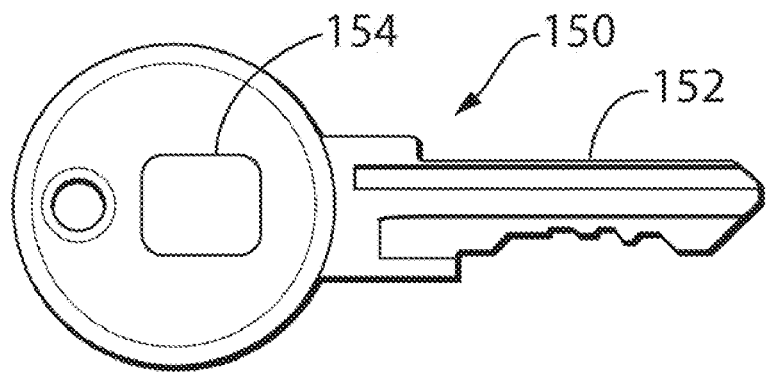
FIG. 7 shows a schematic representation of the structure of an immobilizer key useful with the system of FIG. 1.

The configuration of other devices is preferably similar to that of the mobile control node 624. For example, FIG. 7 shows the immobilizer key 150, which comprises a mechanical or electrical key portion 152, as known in the art per se, that is inserted into a key slot in the vehicle. The immobilizer key 150 also preferably includes an integrated processor/transceiver 154 such as provided by the JN5139. The immobilizer key is preferably battery powered, but it can be powered through inductive coupling or via a power connection formed when the key portion 152 is inserted in a powered key slot, in which case the key portion is electrically connected to the integrated processor/transceiver 154. Similarly, the TPMS sensor unit 142 includes a pressure transducer (not shown) that interfaces with an integrated processor/transceiver 154 such as provided by the JN5139. The TPMS sensor unit 142 may be battery powered, or use some other energy harvesting device such as inductive power coupling or other mechanism for converting the motion or vibration of the wheel into electrical energy for powering the sensor unit.

Remote Control Function

As TP unit 628 is connected to connection 632, mobile control node 624 can appear as a node in the controller area network of vehicle 630 with data link 642 transparently effecting the transfer of data between mobile control node 624 and the controller area network/vehicle control system 120.

In such as case, information from the controller area network or vehicle control system 120 can be displayed on display 716. For example, a security system in vehicle 630 and connected to the controller area network, and to TP unit 628 via connection 632, can provide an indication of the present security status (locked, unlocked, door ajar, etc.) onto the controller area network and mobile control node 624 can display, on display 716, a corresponding and appropriate status indicator. Similarly, tire pressure information from a TPMS can be displayed on display 716.

Further, commands to devices or subsystems of vehicle 630 can be input at keypad 720 of mobile control node 624 and transmitted to TP unit 628 and then, through connection 632, onto the controller area network or vehicle control system. As will be apparent to those of skill in the art, keypad 720 can include predefined keys for functions such as locking or unlocking a vehicle, opening a tailgate, activating a "panic" alarm, initiating a remote start of the vehicle engine, etc. and remote control node 624 can serve as a key fob for a remote keyless entry system. In such a case, the appropriate lock, unlock, etc. command is selected by the user with keypad 720 and that command is forwarded to TP unit 628 which then places the command onto the controller area network in the vehicle to effect the desired response of locking, unlocking doors, etc.

Processor 712 can also execute an appropriate program to cause mobile control node 624 to substantially emulate a wide variety of controls and displays of vehicle 630, as desired. For example, mobile control node 624 can operate to emulate the tuning, volume and other controls of an in vehicle entertainment system when the user is outside of the vehicle. In such as case, display 716 can display appropriate status indicators (i.e.—the channel the radio is presently tuned to, etc.) and labels ("volume up", "volume down", etc.) for soft key functionalities assigned to keys on keypad 720, etc. Display 716 can also display an appropriate status indicator for other controlled functions, such as the status of a requested remote starter activity, etc.

The remote vehicle control or mobile control node system 620 can also be advantageously utilized with battery electric vehicles or other types of such vehicles that rely heavily on a battery for motive power. For instance, some battery electric vehicles do not have an onboard gas engine and have to be recharged by plugging them into an electrical outlet. With such vehicles the state of the battery charge can be an important factor in deciding whether or not the driver wishes to drive the vehicle at any particular time. In system 620, the vehicular control system 120 or a battery charging subsystem therein can communicate the battery charge or recharging state or status to the mobile control node 624 for viewing on display 716. In embodiments where a multi-pixel screen is omitted, the battery charge can be displayed through one or more light emitting diodes (LEDs) located on the mobile control node, e.g., red and green LEDs to indicate charged and not charged status, or utilizing a row of LEDs in the form of a level meter. Similarly, the key fob may also be used to program the charge cycle allowing, for instance, the holder to change from a delayed charge time to an immediate charge time, or vice versa. The system may also wirelessly communicate the mileage available to the user based on the battery charge, and periodically update such information so the user can remotely keep aware of such information as it will assume considerable importance in battery only electric vehicles.

Range Estimate

As previously discussed, the TP unit is preferable able to estimate the range between itself and another transceiver in communication with it. In the preferred embodiment, the range estimate is determined using at least one range estimation modality, and preferably using two, independent, range estimation modalities. Specifically, the time of flight (ToF) for a transmission between TP unit 628 and another transceiver such as mobile control node 624 is employed as a primary modality. If another modality is desired, the radio signal strength at which a transmission is received at each of the TP unit 628 and other transceiver can be employed as the other modality.

When a combination of ToF and other modalities is employed, as described below in more detail, the results obtained from each of these modalities is statistically processed and, eventually, appropriately combined to provide an estimate of the range between TP unit 628 and another transceiver. For example, the range between the vehicle and mobile control node 624 can be determined such that, as the user holding mobile control node 624 moves, the accelerometer 724 in mobile control node 624 provides information with respect to the movement of mobile control node 624. This movement information is combined with the previous range estimates and with range estimates made at each new location to determine a bearing between mobile control node 624 and TP unit 628. (This example is utilized below to describe how range is estimated, which will be applicable to any TP unit/transceiver pair).

As will be apparent to those of skill in the art, a variety of ToF implementations and techniques are well known. For example, one possible ToF method is described in, "RF Time of Flight Ranging for Wireless Sensor Network Utilization", by Lanzisera, Lin and Pister, University of California, Berkeley, published at "Workshop on Intelligent Solutions in Embedded Systems (WISES '06)", Vienna, June 2006. The contents of this publication are incorporated herein, in their entirety, by reference.

In another suitable ToF technique, employed by preferred embodiment, when the vehicle location process commences, each of mobile control node 624 and TP unit 628 sends data to the other of mobile control node 624 and TP unit 628 on a regular basis. As is well known, the time of required for the radio transmission to propagate from one location to another is related to the distance between the two locations.

While it is presently preferred that range estimation be performed with a ToF modality and a second independent modality, it is also contemplated that two different ToF implementations can be employed, such as a combination of the ToF system suggested by Lanzisera et al. and the ToF system described below.

At mobile control node 624, radio transceiver 708 determines the roundtrip ToF for each data transmission from mobile control node 624 to TP unit 628 and back to mobile control node 624 by comparing the time at which the data transmission was received from TP unit 628 with the time the original transmission was sent from mobile control node 624, less a predetermined time delay for processing of the transmission at TP unit 628.

Similarly, at TP unit 628, radio transceiver 640 determines the roundtrip ToF for each data transmission from TP unit 628 to mobile control node 624 and back to TP unit 628 by comparing the time at which the data transmission was received from mobile control node 624 with the time the original transmission was sent from TP unit 628, less a predetermined time delay for processing of the transmission at mobile control node 624.

For the RF signal strength modality, radio transceiver 708 determines the RF signal strength as each data transmission from TP unit 628 is received and compares that received RF signal strength with the signal strength of previous data transmissions received from TP unit 628. Radio transceiver 640 performs a similar operation for each radio transmission received from mobile control node 624. As is well known, the change in RF signal strength for a radio transmission propagating from one location to another is related to changes in the distance between the two locations.

Figure 4:
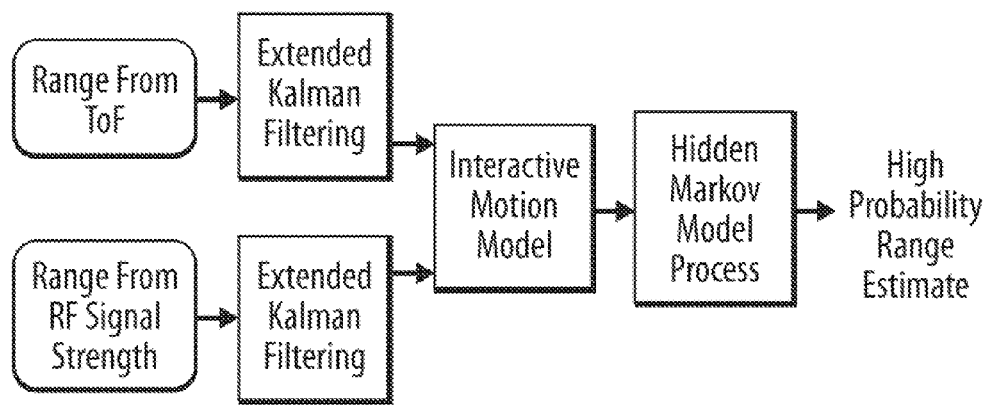
FIG. 4 shows a schematic representation of the range estimation process used with the system of FIG. 1.

FIG. 4 shows the processing path for each of the ToF data and the received RF signal strength data in mobile control node 624. Specifically, a series of raw estimates of range, derived from the ToF data from radio transceiver 708, are input to a Statistical Estimator/Predictor, such as an Extended Kalman Filter (EKF) or other suitable Adaptive Recursive Least Square (RLS) Filtering, Prediction and Tracking Filter. Depending upon the processing capacity of processor 712, it is expected that twenty or more raw estimates will be input to the EKF, which then processes those raw estimates using appropriate range measurement variance and Plant variance models to produce a filtered range estimate.

Similarly, a series of raw estimates of range, derived from the RF Signal strength data from radio transceiver 708, are input to another Statistical Estimator/Predictor, again such as an EKF. Again, depending upon the processing capacity of processor 712, it is expected that twenty or more raw estimates will be input to the EKF, which then processes those raw estimates using appropriate RSSI/LQI (Received Signal Strength Indication/Link Quality Indication) measurement variance and plant variance models to produce a filtered range estimate.

Each of the filtered range estimate from the ToF data and the filtered range estimate from the RF Signal Strength data and then input to a Multiple Models Tracking Method, such as an Interactive Motion Model (IMM) which acts upon these inputs to produce a single, statistically more probable, range estimate which is next provided to a statistical model, such as a Hidden Markov Model (HMM) process or other dynamic Bayesian network. Finally, the HMM process operates with the range estimate from the IMM to produce a high probability range estimate.

While the embodiment discussed herein employs EKF, IMM and HMM estimators, filters and models to statistically process the ToF and RF Signal Strength data, the present invention is not limited to the use of these filters and processes and any suitable statistical and/or physical modeling and analysis processes can be employed, as will be apparent to those of skill in the art. For example, Kalman filters, Particle Filters, Gaussian and non-Gaussian Mixture Models, amongst others, can be used instead of or in conjunction with, the presently preferred EKF. Similarly, Neural Networks, Independent Component Analysis or other models and be used instead or, or in conjunction with, the presently preferred IMM and Fuzzy Logic, Markov Decision Processes, etc. can be used instead of, or in conjunction with, the presently preferred HMM.

A similar processing path is implemented in TP unit 628 for the ToF and RF Signal Strength data from radio transceiver 640 to also produce a high probability range estimate in TP unit 628.

In alternative embodiments, a range estimate can also be provided if the TP unit 628 and mobile control node 624 have circuitry for decoding global positioning signals (GPS), in which case the co-ordinate of each device is known and the distance (an relative location) between the two device can be readily calculated.

Tire Pressure Monitoring System

As shown in FIG. 1, each tire of the vehicle 630 may include a TPMS sensor unit 142 and send tire pressure data to TP unit 628. In addition to the unique ID for each tire, which may be provided by the unique address of every device in a Zigbee network or as part of the application layer, the estimated distance between TP unit 628 and each tire can be used to identify which tire it is (LF or RF or LR or RR or Spare). This can be achieved by packaging the TP unit 628 in a location where it has a unique distance between the unit and each tire, such as shown in FIG. 1 by reference indicators D1, D2, D3, D4 and D5. The tire pressure data may be communicated by the TP unit 628 to another processor in the vehicle control system 120, or the TP unit 628 may be programmed to execute the tire monitoring function. Thus, the vehicle may read or determine the tire pressures and execute an action such as alerting the driver of low tire pressure on vehicle instrument display panel. Also, upon demand from the mobile control node 624 (such as in response to a user input), the vehicle may transmit the data or results to the mobile control node using the wireless communication link.

Immobilizer

As shown in FIG. 1, the immobilizer key 150 may communicate with the TP unit 628 to establish a valid engine start key. For instance, as an application, an appropriately encrypted unique ID for the key, such as the vehicle ID number (VIN), can be communicated between the key 150 and TP unit 628 in order to establish a valid key. Once a valid key is established, the vehicle control system 120 can disable the immobilizer function (which function is normally enabled), allowing the engine to start. The distance between the TP unit 128 and the key 150 is preferably also monitored and unless it is determined to be within a specified, relatively short, range, the vehicle control system 120 preferably does not disable the immobilizer function, thus adding an extra layer of security.

Passive Keyless Entry

The high probability range estimate produced in TP unit 628 can be employed for a variety of functions in addition to the vehicle locator function described in greater detail below. For example, the high probability range estimate can be used as part of a Passive Keyless Entry (PKE) system. PKE systems operate such that the security system in a vehicle deactivates when a user holding an authenticated key fob is within a specified proximity. However, such systems generally suffer from disadvantages in that they cannot determine the proximity of the user to the vehicle with much accuracy. Accordingly, additional conditions are applied to such systems to prevent false determinations of user proximity, such as requiring the user to touch a door handle before deactivating an alarm system and/or unlocking the vehicle.

In the preferred embodiment, the high probability range estimate produced as described above can be employed by the PKE system. In this case, the range within which a user must be located to deactivate security systems can be defined very closely to the vehicle as the presence of the user within this defined perimeter can be determined with a high level of confidence. Accordingly, the PKE system can be implemented to unlock the vehicle without requiring the user to touch, or move, the door handle.

Figure 8:
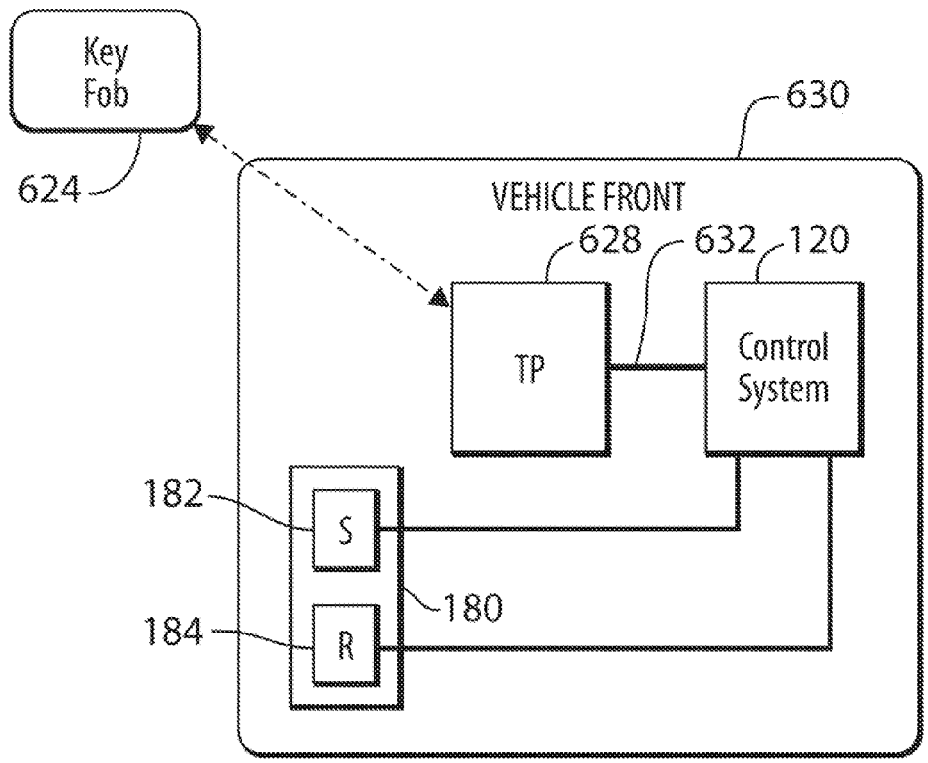
FIG. 8 shows a schematic representation of a vehicle door control subsystem, provided in the system of FIG. 1.

Optionally, for added safety, the door may not unlock automatically as the driver approaches the vehicle. Rather, the vehicle control system 120 may wait for the switched signal for the door handle as the driver pulls the door and actuates the unlocking function. As shown schematically in FIG. 8, a switch 180 can be embedded inside door handle mechanism 182, such as disclosed in U.S. Pat. No. 6,977,619 (the disclosure of which is hereby incorporated by reference herein in its entirety). The delay between pulling the door handle 182 and actuating the unlocking function is preferably minimal enough such that it does not appear to be a nuisance to the driver. Upon receiving an unlock signal from the door handle 182, the TP unit 628 (or, more generally, the vehicle control system 120) may actuate a relay or solenoid 184 directly to unlock the door. The passive unlocking feature may be set or programmed to only work if the distance D between the mobile control node 624 (or immobilizer key 150) and the TP unit 628 is within the predefined range D to ensure safety and security of the operator as well as the vehicle.

For a passive locking function, it is desirable that the ignition key is in the OFF position, and that all of the doors be in the closed position before such a function will operate. The locking function may occur when the estimated range between the mobile control node 624 and the TP unit 628 is greater than a predefined distance and the distance is increasing, and an RKE lock signal has not been received. If these conditions are met then the TP unit 628 or some other element of the vehicle control system 120 may actuate the relay or the solenoid 184 directly to lock the doors. Upon locking the doors, the vehicle alarm system may be armed.

Advanced Passive Keyless Entry

Figure 12:
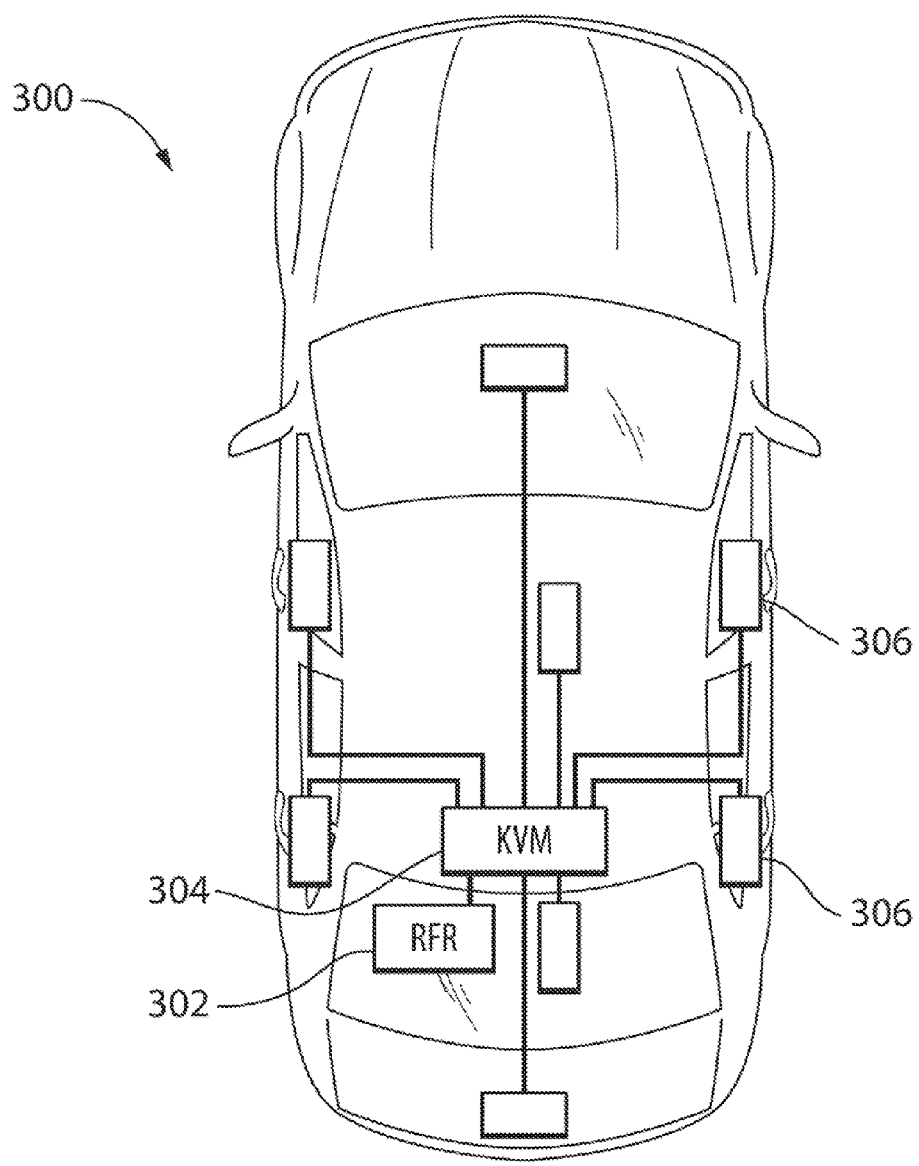
FIG. 12 is a schematic diagram of a prior art PKE system.

It is known to provide advanced passive keyless entry systems where the system is "smart" enough to detect where the person holding the key fob is located in close quarters relative to the driver's door. In the prior art such systems typically employed six antennas near the front, middle and rear of the vehicle passenger cabin, in the left and right front side doors, and in or near the trunk of the vehicle. With six such antennas the system is able to locate the key fob in one of six quadrants, and thus can determine which quadrant the person is coming from and located in, and thus, for instance, open only the driver's side door when the key fob is located within the vicinity of the antenna located in the front vehicle driver's door. The problem with such prior art systems is that there are many antennas that have to be installed throughout the vehicle. As such systems conventionally operate at 125 kHz, the antennas are relatively bulky and it is problematic to find the space to install them. For example, FIG. 12 shows a prior art PKE system 300 having an RF receiver 302 connected to nine LF antennas 306 disposed at various locations in the vehicle via a KVM (keyboard, video, mouse) switch 304.

Figure 13:
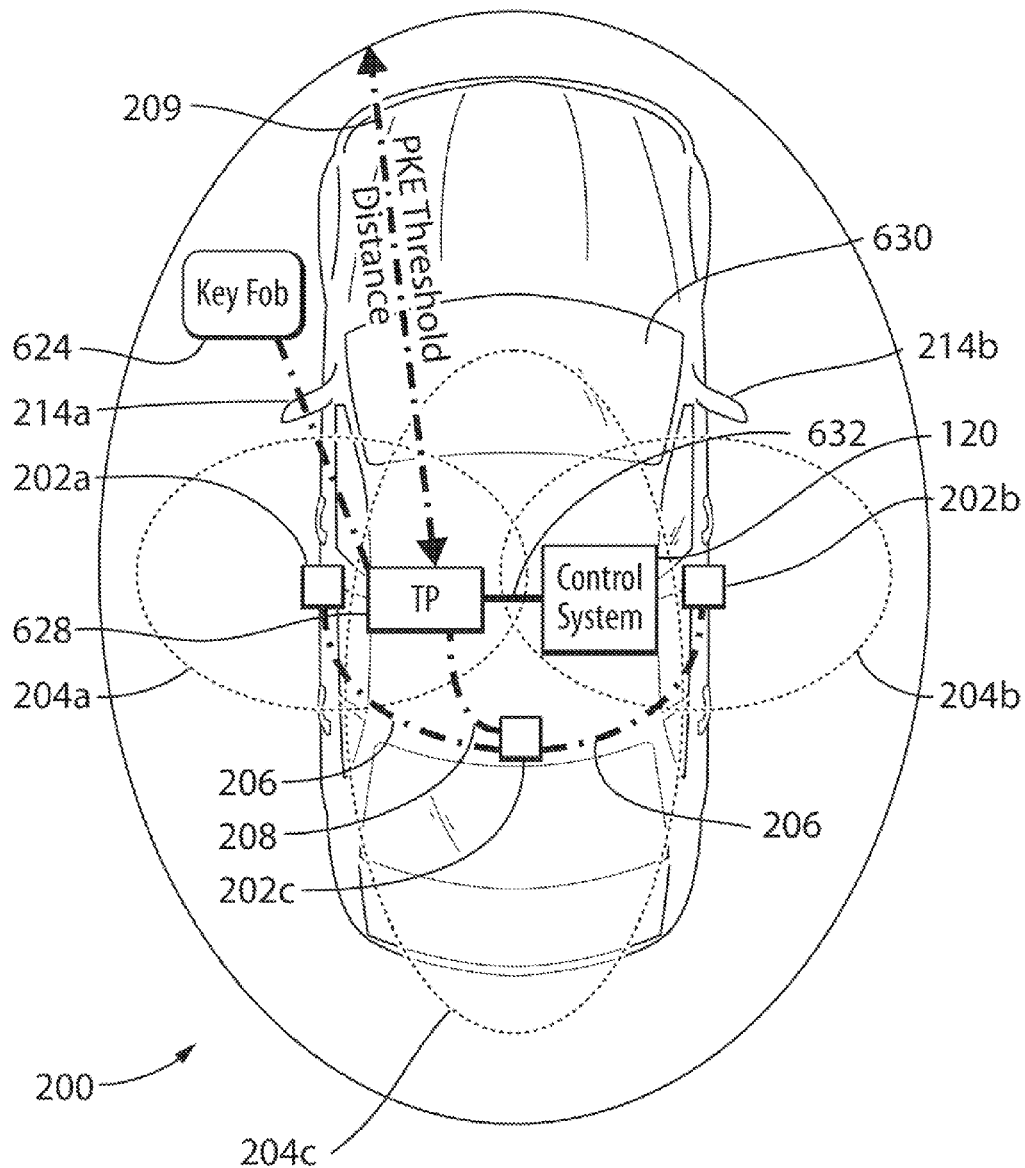
FIG. 13 is a schematic diagram of first embodiment of an advanced PKE subsystem which utilizes multiple wireless subnetworks to detect the location of a key fob relative to a vehicle.

FIG. 13 shows one embodiment of an advanced PKE close quarter subsystem 200 (that may be combined with the other wireless devices or subsystems shown in FIG. 1) that also utilizes the preferred 802.15.4/Zigbee communication protocol to couple a plurality of high frequency antenna systems 202a, 202b, 202c to the TP Unit 628 (which is associated with a separate high frequency antenna 636 as discussed previously). In this embodiment, the additional antenna systems 202 are designed to operate at the same frequency bandwidth as the preferred communication protocol, e.g., 2.4 GHz. Each antenna system 202 comprises a physical antenna or radiator such as a dipole, patch or microstrip structure (not shown) that is connected to a processor unit (not shown) such as the JN5139 or JN5147 discussed above that in turn is connected as known in the art per se to the vehicle battery accessory system. Since the radiator operates at a relatively high frequency it has a small physical size and can be inexpensively manufactured in comparison to larger 125 kHz antennas. In addition, the JN5139 or JN5147 processor is relatively inexpensive and thus each antenna system 202 can be manufactured relatively inexpensively. Moreover, due to its small size, consisting essentially of a small PCB having a small microchip, a radiator and a power connector (with potentially a small dc-to-dc converter and filter, depending on the type of processor employed) mounted thereon, the antenna system 202 can be easily placed in the vehicle.

In the illustrated embodiment, antenna system 202a functions as a local coordinator for antenna systems 202b and 202c. Thus, wireless links 206 connect antenna systems 202b and 202c to antenna system 202a, which provides the base processing for the subsystem 200 and communicates proximity data with the TP unit 628 via wireless link 208. Alternatively, each antenna system 202a, 202b and 202c may wirelessly communicate directly with the TP unit 628, which provides base processing for the subsystem 200. In the further alternative, the processor units from each of the antenna systems and the TP unit 628 may be physically connected together via the vehicle bus or directly hardwired together.

Each antenna system 202 is designed to have a close quarter radiation pattern (at the maximum transmission power ratings) as schematically indicated by linearly polarized fields 204a, 204b and 204c. Antenna systems 202a, 202b are preferably located at, near or in the vehicle left and right front doors, and project left and right lobed radiation patterns 204a, 204b extending outward of the vehicle. Antenna system 202c is preferably located in the passenger compartment and features a central lobe radiation pattern that extends to the rear of the vehicle, as may be provided by suitably locating the antenna system 202 in the roof panel or near a rear window. In the illustrated embodiment, the radiation patterns of each antenna system 202a, 202b, and 202c intersect in the passenger compartment and are preferably sufficient in scope to provide wireless communication with the base TP unit 202b.

Figure 13A:
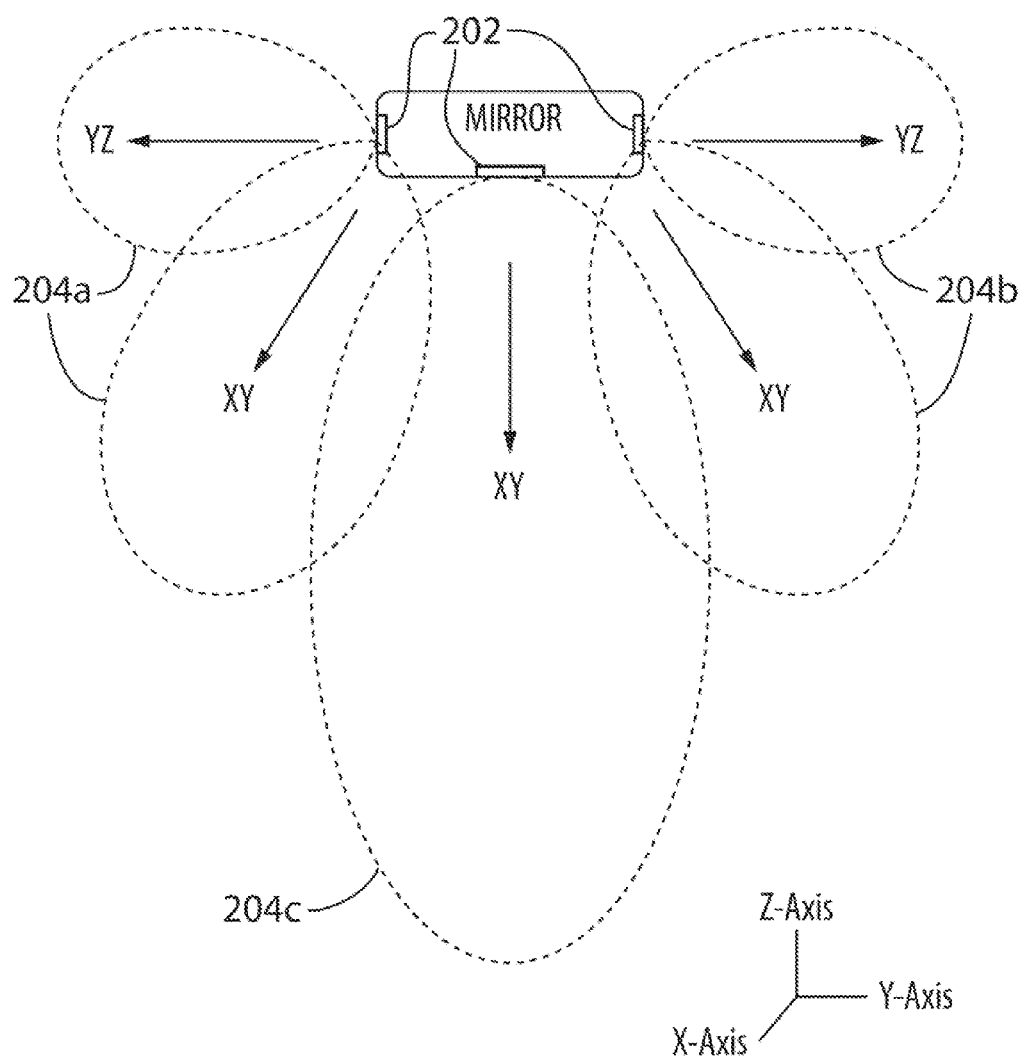
FIG. 13A is a schematic diagram of a second embodiment of an advanced PKE subsystem which utilizes multiple wireless subnetworks to detect the location of a key fob relative to a vehicle.

In an alternative embodiment, as shown in FIG. 13A, left, right and central radiation pattern lobes 204a, 204b, 204c are achieved by mounting antenna systems 202 in a vehicular rear mirror 216. (Note: radiation patterns are not shown for all planes.) In a further alternative assembly, antenna systems 202 may be individually mounted in left and right exterior rearview mirrors 214a 214b (FIG. 13), and one antenna system 202 in the central interior rearview mirror assembly 216.

With foregoing radiation patterns, as seen best in FIG. 13, as the key fob 624 approaches the vehicle it will first cross a PKE distance threshold 209 based on the high probability range estimate computed by the TP unit 628 as discussed above. Until at least this distance threshold 209 is reached, the TP unit antenna is active for communicating with the key fob 624 and the PKE function is preferably disabled until this distance threshold is passed.

Once the key fob 624 is within the distance threshold 209, the high probability range estimate can become less accurate due the short time of flight between the TP unit 628 and key fob 624, and in addition the system is relatively insensitive to relative location. However, the key fob, being a Zigbee enabled device, will enter into one or more of the close quarter radiation fields 204a, 204b, or 204c and hence will have the ability to communicate with the corresponding antenna system 202a, 202b, or 202c, each of which is preferably configured as a full function Zigbee device. Once the key fob crosses the distance threshold 209, the antenna systems 202a, 202b, or 202c can begin to send out discovery messages to instigate communication with the key fob or, in the alternative, the TP unit can instruct the key fob to send out discovery messages to join the one or more wireless networks provided by the antenna systems. The successful establishment of a communication link between any of the antenna systems and the key fob indicate that key fob is located in the corresponding field 204a, 204b, 204c, and hence the close quarter location of the key fob can be identified.

To aid in limiting the number of the antenna systems associated with the key fob, the signal transmission power of the key fob and/or the antenna systems may be limited so that the fob/antenna system association is limited to situations where only a "strong" signal is present. The RSSI and or link quality data can also be used to assess "strong" signal.

Figure 14A:
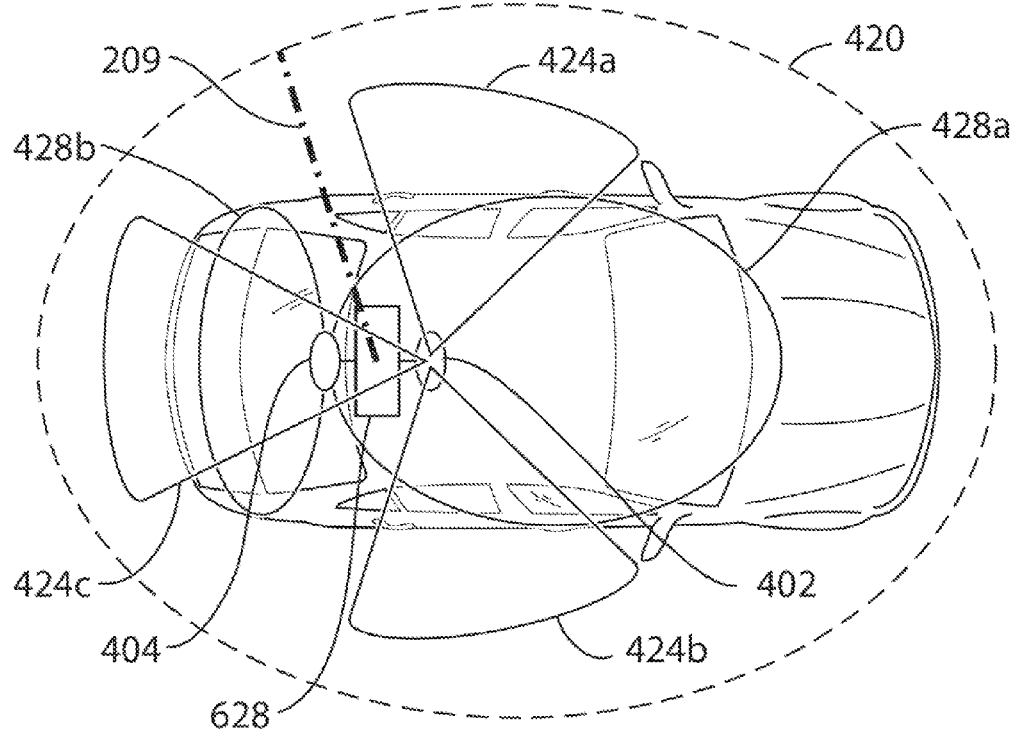
FIG. 14A is a schematic diagram of a third embodiment of an advanced PKE subsystem which utilizes multiple a multiplex array of antennas to detect the location of a key fob relative to a vehicle.
Figure 14B:
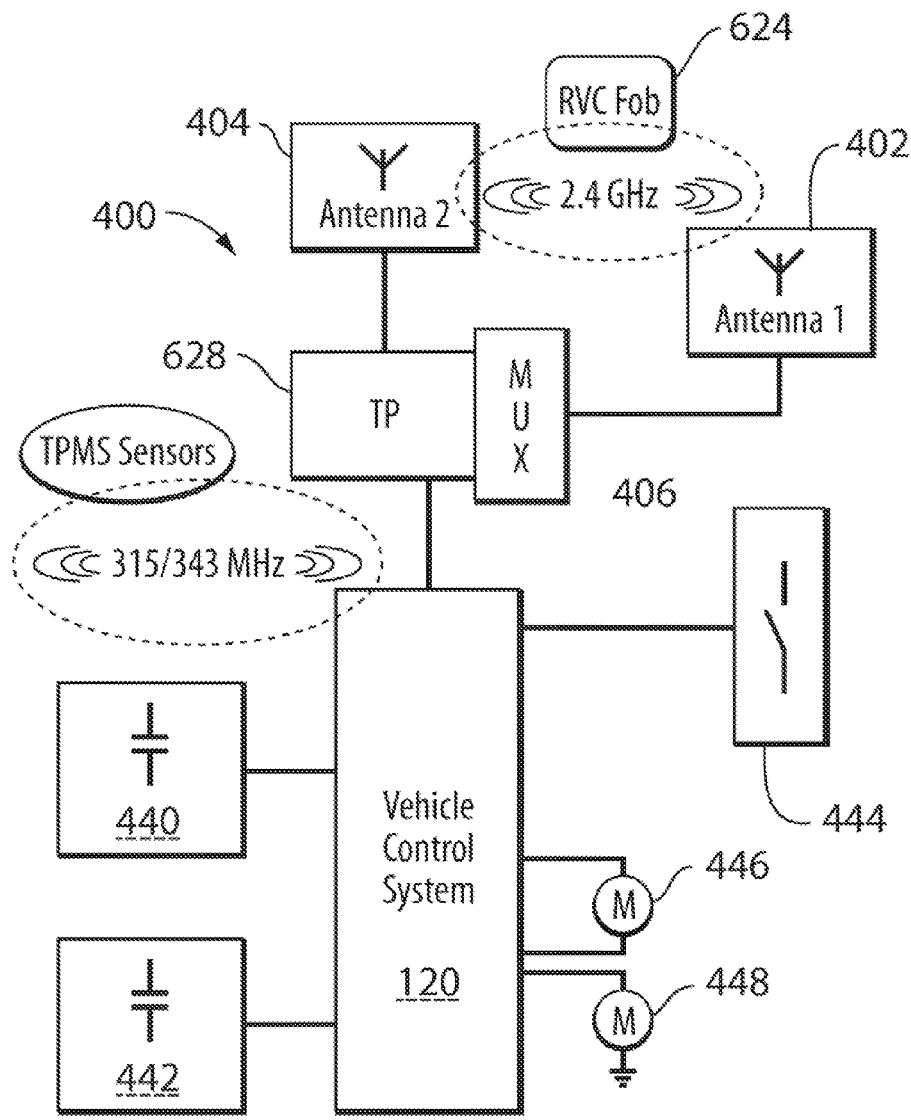
FIG. 14B is a system block diagram of the PKE subsystem shown in FIG. 14A.
Figure 15A:
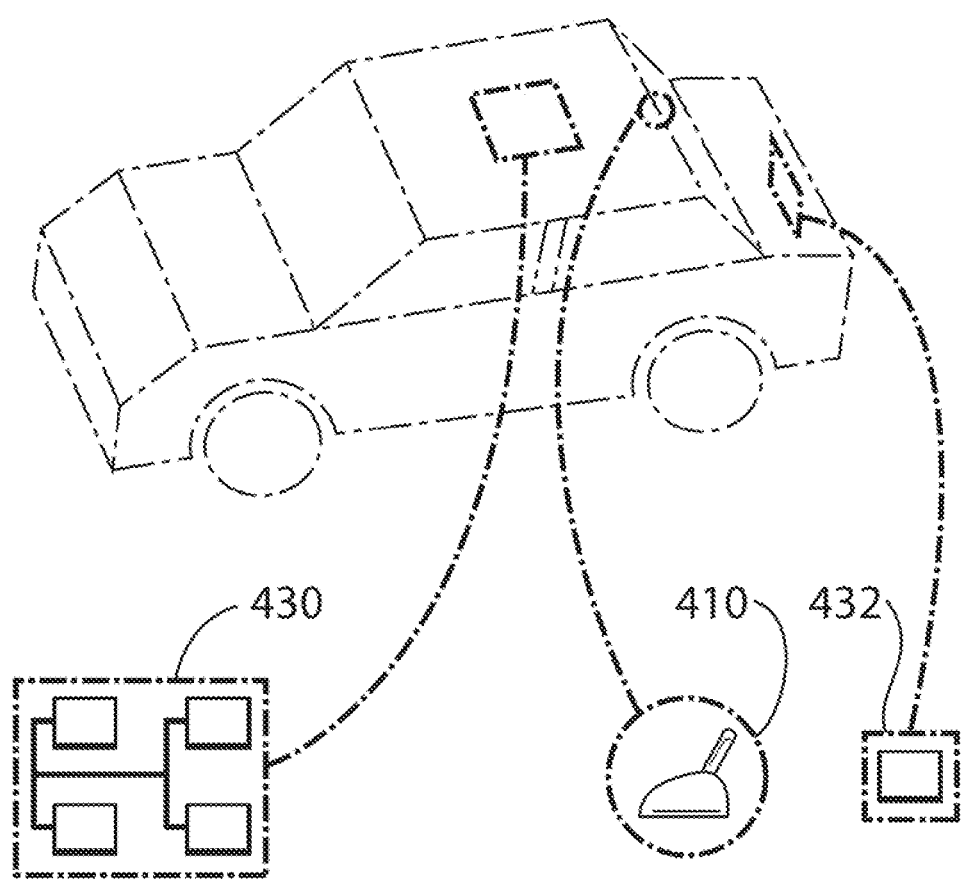
FIG. 15A is a schematic diagram of antenna mounting locations in the vehicle for the PKE subsystem shown in FIG. 14A.
Figure 15B:
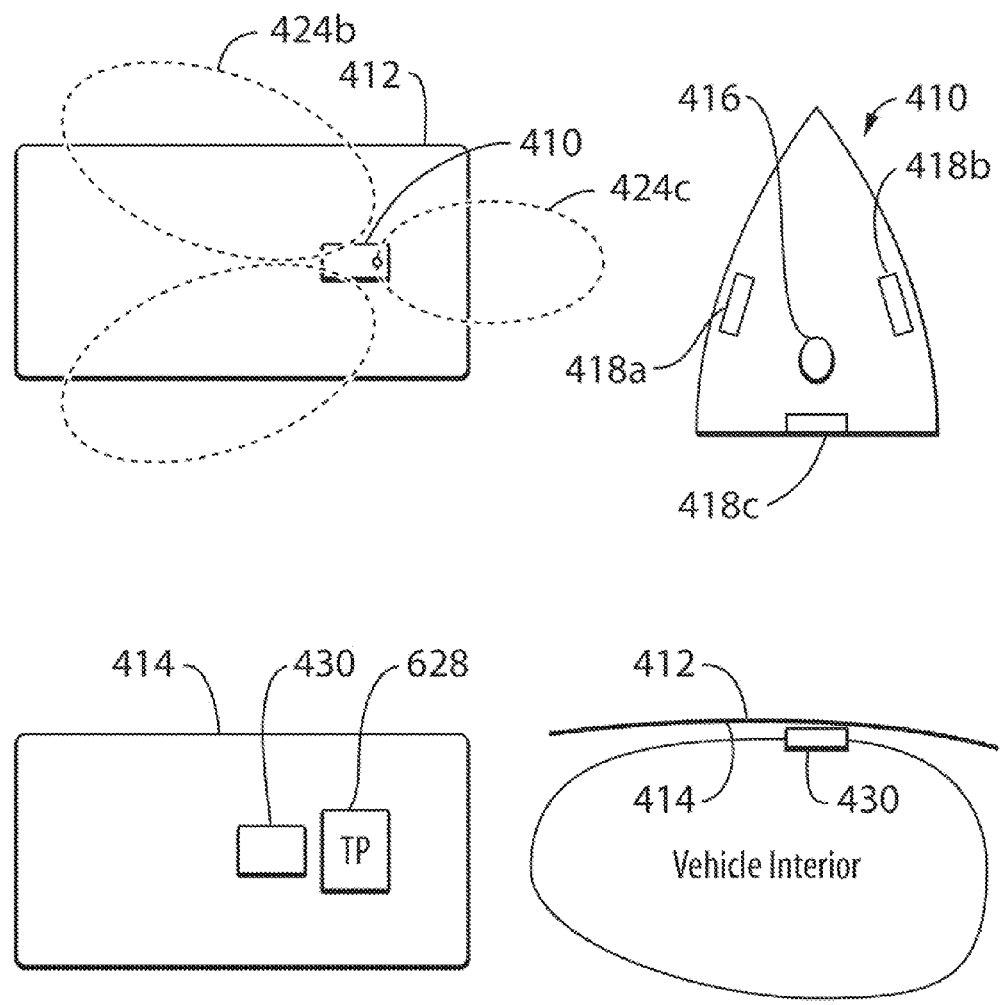
FIG. 15B is a series of schematic diagrams illustrating the design and placement of the antennas for the PKE subsystem shown in FIG. 14A.
Figure 16A:
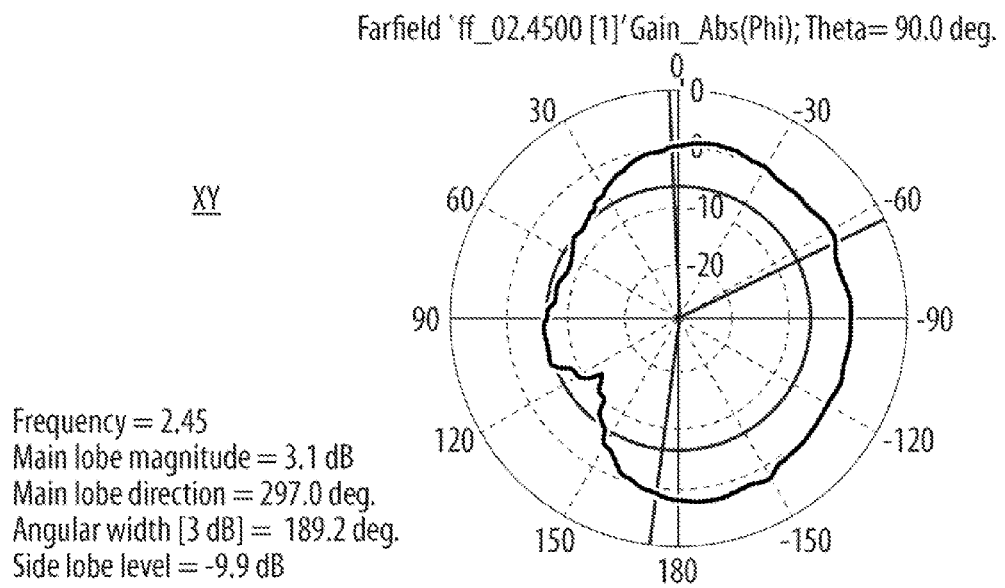
FIGS. 16A-16I are plots of radiation patterns provided by the antennas of the PKE subsystem shown in FIG. 14A
Figure 16B:
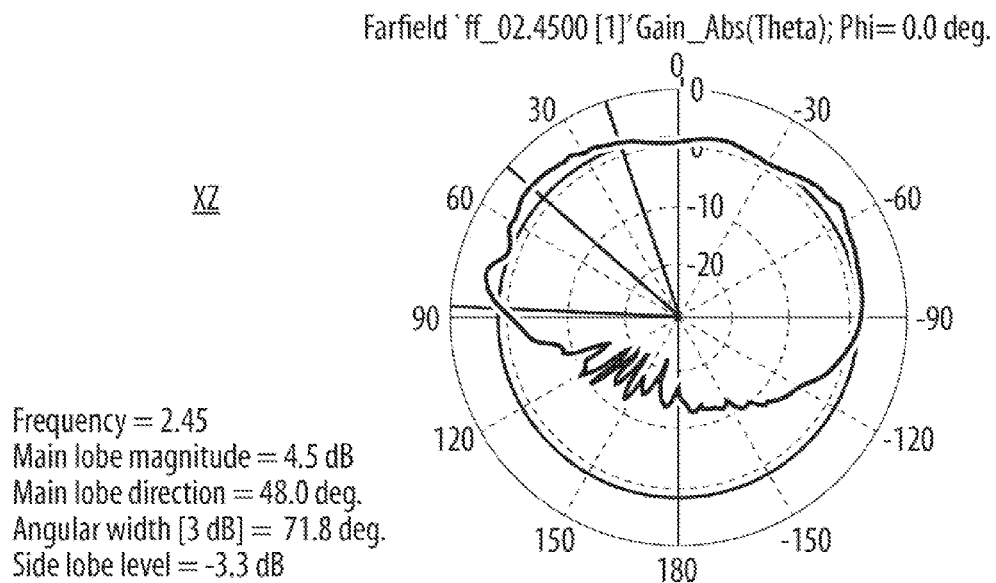
Figure 16C:
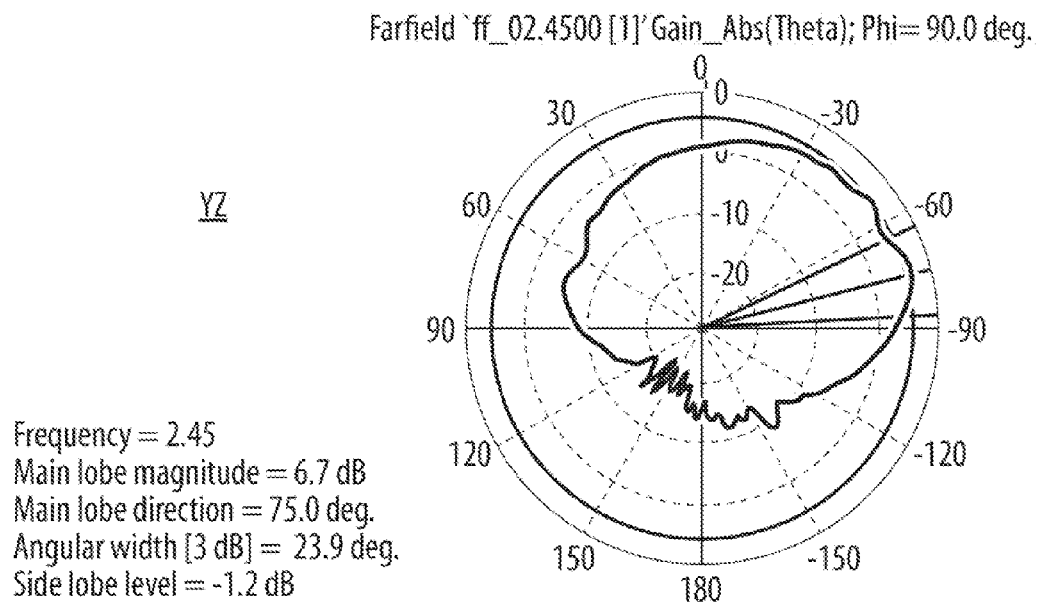
Figure 16D:
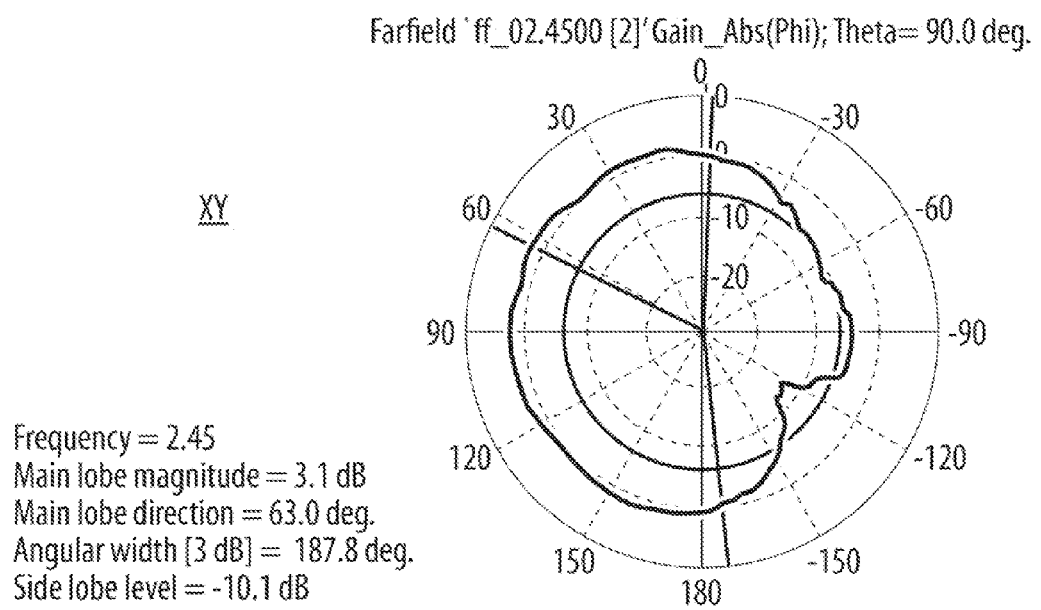
Figure 16E:
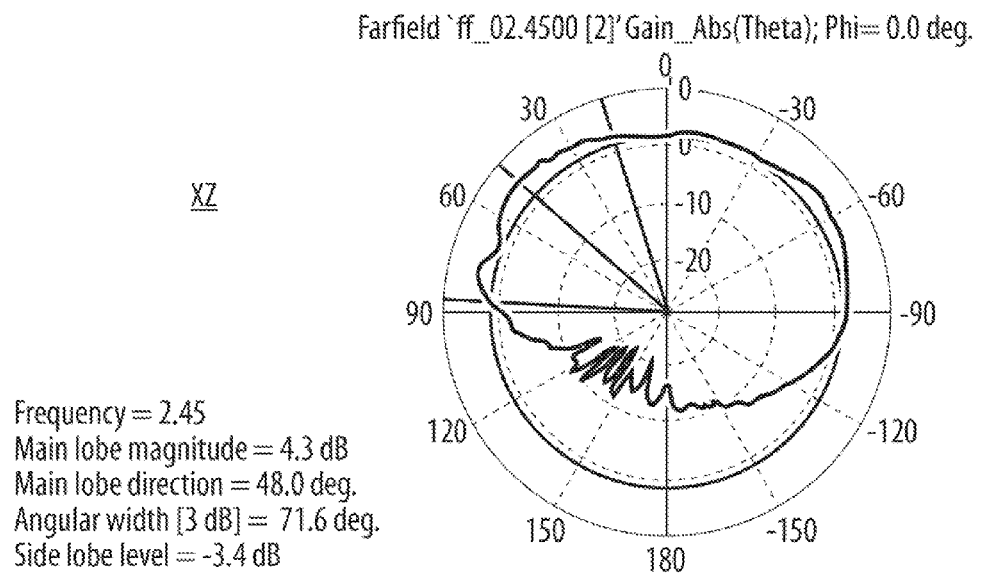
Figure 16F:
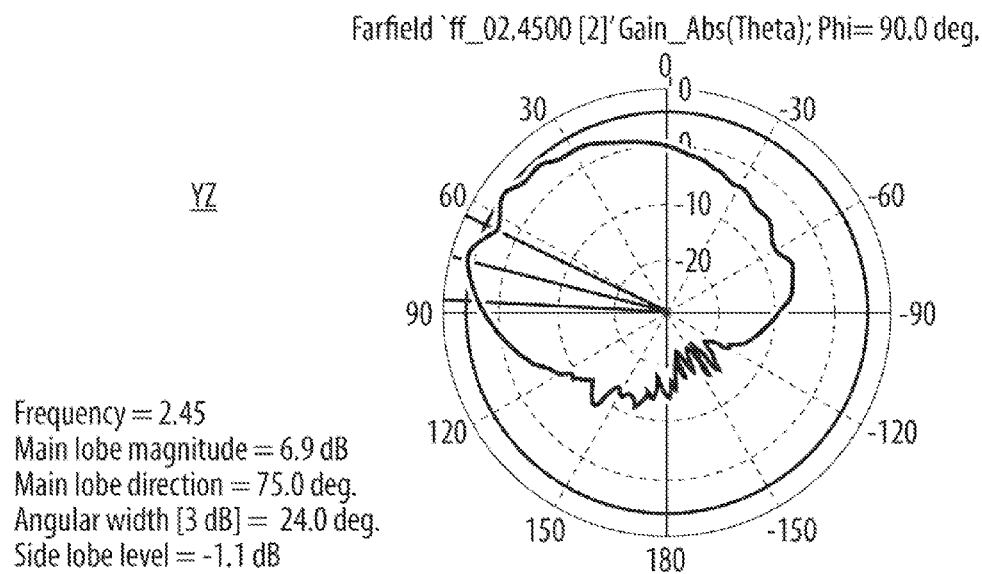
Figure 16G:
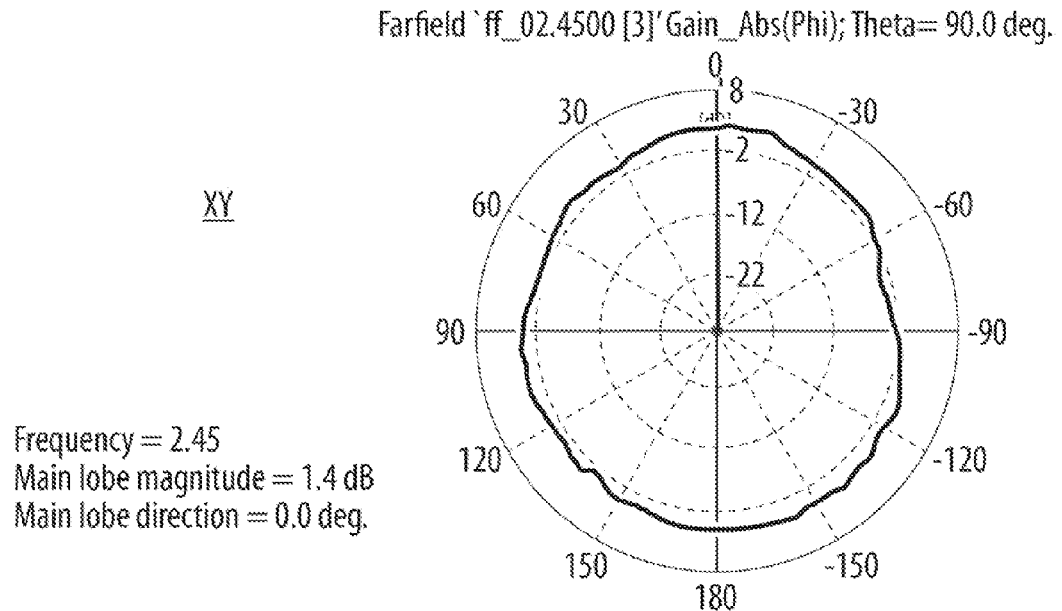
Figure 16H:
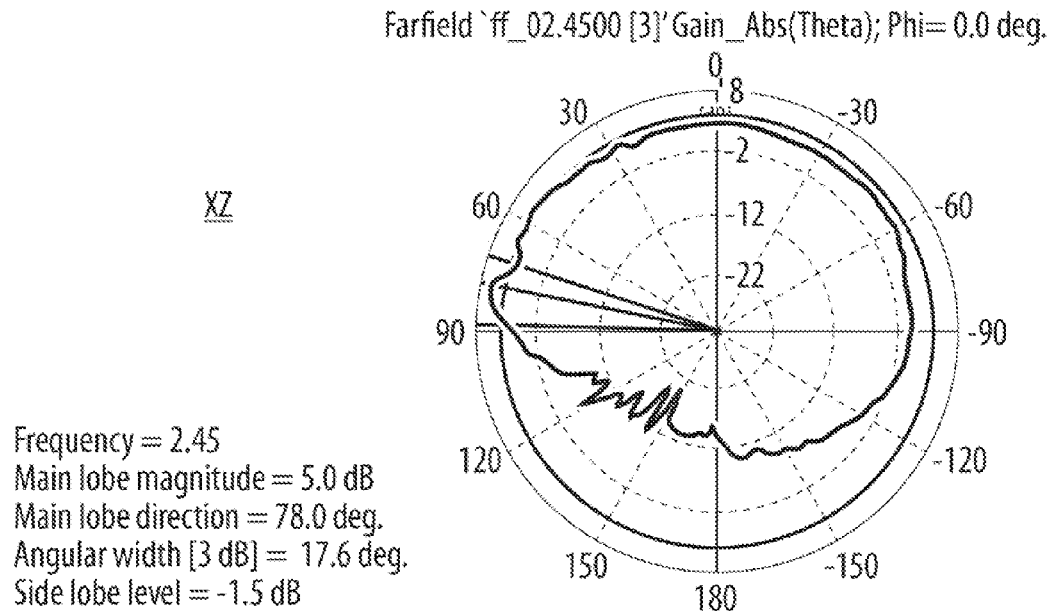
Figure 16I:
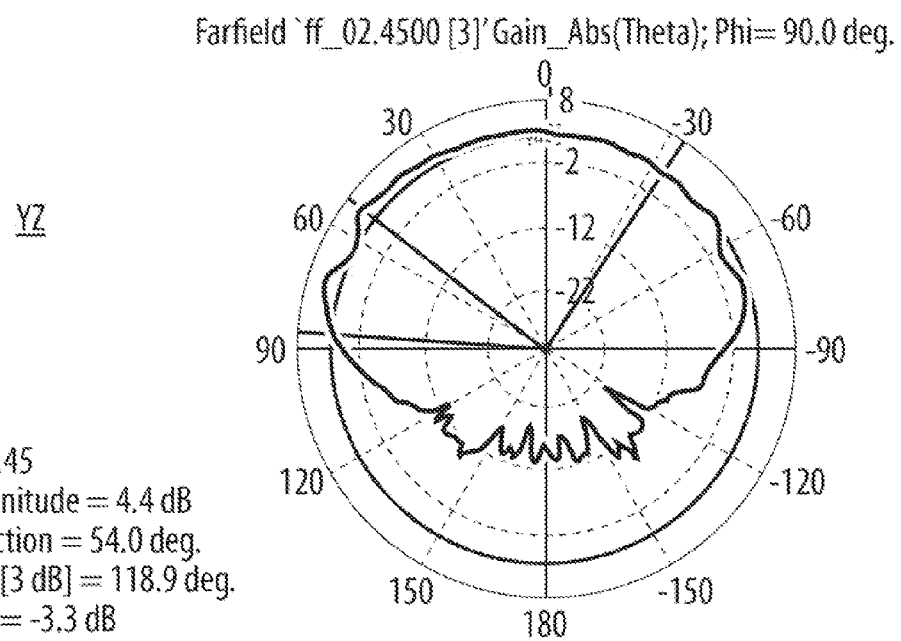

An alternative embodiment of an advanced PKE subsystem 400 that relies on a multiplex antenna scheme rather than on multiple wireless subnetworks is shown in FIGS. 14-16. In this particular embodiment, as shown in FIGS. 14A and 14B, two antenna arrays 402 and 404 are connected to the TP unit 628 via a switch 406. One array 402 is implemented in a "fin module" 410, shown in greater detail in FIGS. 15A and 15B. The fin module 410 is externally mounted on top of the roof 412 of the vehicle and incorporates an omni-directional monopole mast antenna 416 that provides a far field radiation pattern 420 for communication with the key fob 624. The module 410 also includes three PTA antennas 418a, 418b, 418c that provide respectively, left, right and rear close quarter radiation patterns 424a, 424b, and 424c. (Radiation pattern 424a is plotted in three planes in FIGS. 16A-C, where the X direction is the vehicular longitudinal axis, the Y direction is the vehicular latitudinal or cross-car axis; and direction Z is the vertical direction. Likewise, radiation pattern 424b is plotted in the three planes in FIGS. 16D-F, and radiation pattern 424c is plotted in the three planes in FIGS. 16G-I.) Note that in this embodiment, because the close quarter PIFA antennas 424a, 424b, and 424c are mounted on the roof of the vehicle which functions as a ground plane, the radiation pattern provided by such antennas does not extend substantially into the passenger compartment. Each of these antennas is connected via the RF switch 406 to the TP unit 628, which is preferably mounted to the inner side 414 of the vehicle roof, under the roof liner, thus minimizing relatively expensive coaxial cable runs between the antennas and the TP unit 628.

It should also be understood that the PIFA antennas 424a, 424b, and 424c may alternatively be mounted in the vehicular interior rear view mirror 216, or in a combination of the interior and exterior rearview mirrors in a matter similar to that shown and discussed in reference to FIGS. 13 and 13A.

In order to determine the presence or absence of the key fob in the passenger compartment (useful for passive start function as described below), the second antenna array 404 includes two patch antennas 430, 432. Antenna 430 is a 2×2 patch array mounted under the roof liner adjacent to the TP unit 628. This antenna provides a radiation pattern 428 a substantially covering the interior of the vehicle. Antenna 432 is a single patch antenna disposed in the vehicle trunk or rear storage compartment area and designed to provide a radiation pattern 428b designed to cover the trunk or rear storage compartment area.

As indicated, the omni-directional monopole mast antenna 416 is utilized for remote control functions, including RKE. The left/right/rear PIFA antennas 418a, 418b, 418c are used primarily for PKE functions and they are not active until such time as the key fob crosses the PKE distance threshold 209. The TP unit 628 detects the distance between the FOB and the vehicle and when the threshold is crossed, places the system in either a RKE or PKE mode. In the PKE mode, the TP unit 628 switches between the PIFA antennas 418a, 418b, 418c and patch antennas 430, 432 to collect and analyze RSSI data collected from all its antennas in order to determine the FOB location. The differential and absolute RSSI values and link quality values from the three (left/right/rear) PIFA antennas 418a, 418b, 418c determines which side of the vehicle the key fob is located. In particular, by comparing the RSSI signal strength received by the left and the right PIFA antennas 418a, 418b, the TP unit 628 can distinguish if the FOB is on the left or the right side of the vehicle. The gains of these antennas are also carefully calibrated to aid in discrimination based on experimental data.

Furthermore, the TP unit 628 utilizes the patch antennas 430, 432 to determine RSSI between it and each antenna 430, 432. By comparing the RSSI to a preset threshold value, the TP unit 628 distinguishes if the key fob is inside or outside the vehicle or trunk, thus enabling its passive start (PS) and/or immobilizer functionalities Accordingly, it will be seen that in either the embodiment utilizing the multiplex antenna scheme (FIGS. 14A-16I) or the multiple wireless subnetworks (FIG. 13), the advanced PKE subsystem is able to ascertain (1) whether or not the key fob is within or outside of threshold distance from the vehicle; (2) if the fob is within the threshold distance, its location relative to the right, left or rear of the vehicle; and (3) the presence of the key fob within the vehicle compartment. With such data the vehicular control system 120 is able to detect authenticate the key fob at a distance and when the key fob approaches a predetermined distance to the vehicle enter into a PKE mode. In the PKE mode, the vehicle control system detects the location of the key fob relative to the vehicle, determining if the key fob is near the driver's side, passenger side or rear of the vehicle and depending on the location enables the opening of the nearest door. For example, as seen in FIG. 14B upon approach of the key fob to one of the vehicle doors a corresponding capacitive door handle sensor 440 may be passively or automatically enabled to provide a drive signal to a corresponding door lock/unlock motor 446 or a trunk release latch 448. In addition, knowing the approach of the key fob to the vehicle enables the vehicle control system to passively or automatically illuminate certain exterior illumination, such as right or left side security lights or puddle lamps located in the exterior rear view mirrors or in the exterior handles of the vehicle doors. Similarly, The vehicle control system may also move from the PKE mode into a passive start (PS) mode when the key fob is located in the interior of the vehicle. In this mode the vehicle engine may be turned on keylessly by enabling an engine "start" button 444 to operate when pressed.

Vehicle Locator

In addition to serving as a node in a controller area network in a vehicle, mobile control node 624 and TP unit 628 can provide a vehicle locator service. As will be appreciated, it can sometimes be difficult to locate a vehicle which has been parked in a busy parking lot or which has otherwise been out of sight for some time. Accordingly, mobile control node 624 and TP unit 628 can interoperate to provide a user holding mobile control node 624 with an indication of the location of vehicle 630 relative to the location of mobile control node 624.

Specifically, mobile control node 624 will, from time to time, attempt to communicate with TP unit 628. If mobile control node 624 is within radio communication range of TP unit 628, the vehicle location function can be commenced, either automatically, or by a user input on keypad 720.

In addition to providing a range or distance to the user's vehicle, the preferred embodiment also provide a direction, or bearing, indicating the location of the vehicle relative to the mobile control node 624. Accordingly, the high probability range estimate produced at TP unit 628 in the vehicle is transmitted to mobile control node 624 where it is used with the high probability range estimate produced at mobile control node 624 to determine the bearing between mobile control node 624 and the vehicle.

Figure 5:
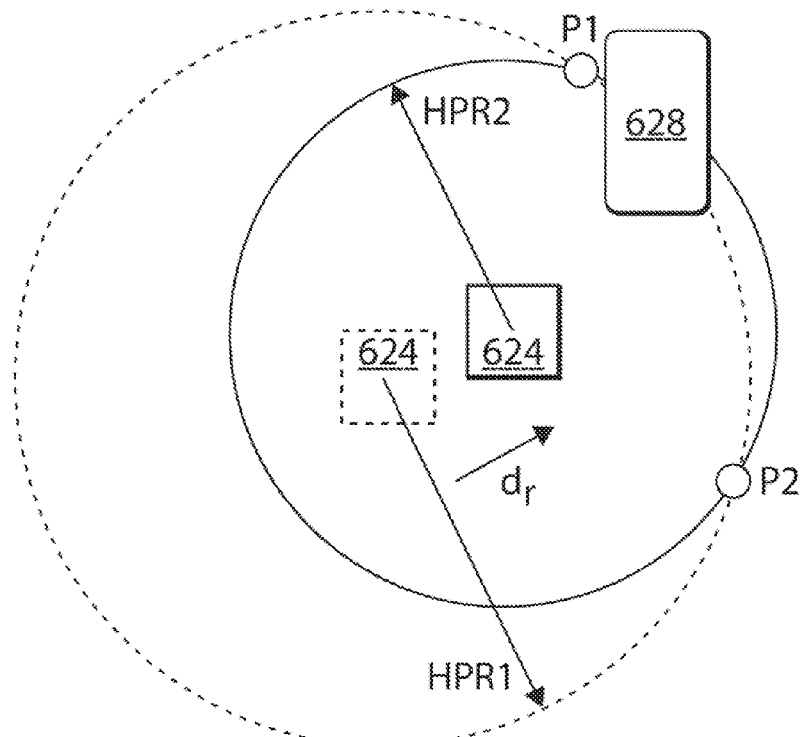
FIG. 5 shows a schematic representation of a step in a vehicle location function provided in the system of FIG. 1.

FIG. 5 shows mobile control node 624 at a first position (indicated by dashed line) with respect to TP unit 628 in the vehicle to be located. The high probability range, determined as described above, between mobile control node 624 and TP unit 628 is indicated by the circle with radius HPR1.

As the user holding mobile control node 624 walks some distance in some direction to a second position (indicated by solid line), the range between the mobile control node 624 and TP unit 628 decreases to HPR2, again as determined by the above-described process, and is indicated in the Figure by the circle with the solid line. As can be seen, the first circle with radius HPR1 intersects at two points, P1 and P2, with the circle with radius HPR2.

Figure 6:
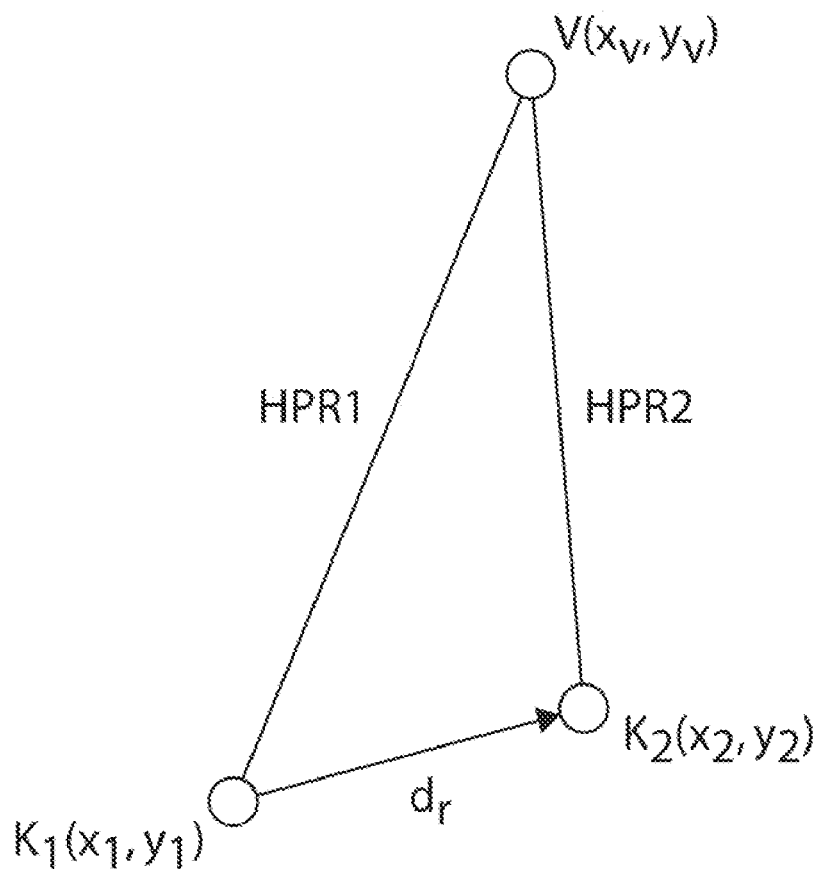
FIG. 6 shows the geometric analysis used in the vehicle location function provided in the system of FIG. 1.

In view of the above, the bearing from mobile control node 624 to TP unit 628 in the vehicle can be estimated, with reference to FIG. 6, as follows:

(1) The vehicle V is at position V($x_v$, $y_v$), mobile control node 624 is at position $K_1(x_1, y_1)$ and the high probability range between mobile control node 624 the vehicle is HPR1.

(2) The user holding mobile control node 624 moves to a new location $K_2(x_2, y_2)$ and the high probability range between mobile control node 624 and the vehicle is HPR2.

(3) The relative distance traveled from position $K_1(x_1, y_1)$ to $K_2(x_2, y_2)$ is denoted by $d_r$. This relative distance is obtained from accelerometer 724 in mobile control node 624. The relative direction of the travel is given by:

$$HPR_2^2 = HPR_1^2 + d_r^2 - 2HPR_1 d_r \cos(\theta_{1,2}) \tag{1}$$

$$\cos(\theta_{1,2}) = \frac{HPR_1^2 + d_r^2 - HPR_2^2}{2HPR_1 d_r} \tag{2}$$

where $\theta_{1,2}$ is the relative angle between the two points $K_1, K_2$. The relative angle $\theta_{1,2}$ can be obtained from the above equation.

(4) Since the two circles with centers at $K_1(x_1, y_1)$, and $K_2(x_2, y_2)$ have different radii HPR1, HPR2, they intersect at two points, namely V($x_v$, $y_v$) (point P1 in FIG. 5), and another point V'($x_{v'}$, $y_{v'}$) (point P2 in FIG. 5). These points can be determined as follows:

for point $P_1$ $$x_v = x_1 + \cos(\theta_{1,2})^2 + \sin(\theta_{1,2})\sqrt{R_1^2 - d_r^2} \tag{3}$$

$$y_v = y_1 + \cos(\theta_{1,2})\sin(\theta_{1,2}) - \cos(\theta_{1,2})\sqrt{R_1^2 - d_r^2} \tag{4}$$

and for point $P_2$ $$x_{v'} = x_1 + \cos(\theta_{1,2})^2 - \sin(\theta_{1,2})\sqrt{R_1^2 - d_r^2} \tag{5}$$

$$y_{v'} = x_1 + \cos(\theta_{1,2})^2 + \cos(\theta_{1,2})\sqrt{R_1^2 - d_r^2} \tag{6}$$

Initially, mobile control unit 624 will not be able to determine which of the two possible intersection points is the correct location of TP unit 624 and can arbitrarily pick either one, or some point in between. However, as the above described process is repeated, the location of the one of points P1 and P2 which corresponds to the location of TP unit 628 will vary only minimally, while the location of the other of points P1 and P2 will vary significantly and mobile control node 624 will deem the relatively unvarying point (P1 or P2) as the location of TP unit 628 and will provide bearing information with respect to that point.

(5) As the user holding mobile control node 624 moves in the area, the high probability range and locations of P1 and P2 are determined for each location providing multiple estimates of V($x_v$, $y_v$) and the relative direction from mobile control unit 624 to the vehicle can then be estimated using the following:

$$\tan(\theta_{i,v}) = \frac{(x_v - x_i)}{(y_v - y_i)} \quad (3)$$

where $\theta_{i,v}$=the relative heading (direction) between the vehicle and mobile control node 624 at point $K_i$ ($x_i$, $y_i$).

(6) Compass 728 provides the heading $\theta_k$ of the mobile control node 624 at position $K_i$ ($x_i$, $y_i$) and the compass bearing to the vehicle $\theta_v$ can be obtained from:

$$\theta_v = \theta_k + \theta_{i,v} \quad (4)$$

It should be noted that, the above assumes that HPR1 is greater than HPR2, i.e.—that the user is walking towards the vehicle. In the event that the user is walking away from the vehicle (i.e.—HPR2>HPR1), then mobile control unit 624 will instruct the user to reverse their direction and the process will recommence.

It is contemplated that, to improve the accuracy of the vehicle location process, the high probability range determined at TP unit 628 can be communicated to mobile control node 624 and appropriately combined with the high probability range determined at mobile control node 624 for use in the vehicle locating function. The high probability ranges can be averaged, or otherwise statistically processed, to reduce errors which could otherwise result in reduced accuracies in the above described bearing determination process.

In practice, utilizing the Jeninc JN5139 or JN5147 transceiver, the bearing displayed to the user may be updated after every 5 or 6 steps, or about every 3-5 meters of walking distance. The accuracy improves after about 15-20 steps once the algorithm has had an opportunity for a few iterations, in which case the error margin is anticipated to be about plus/minus 11.25 degrees after 15-20 steps. The error margin is expected to improve as the range between the mobile control node and the vehicle decreases.

Figures 9, 10:
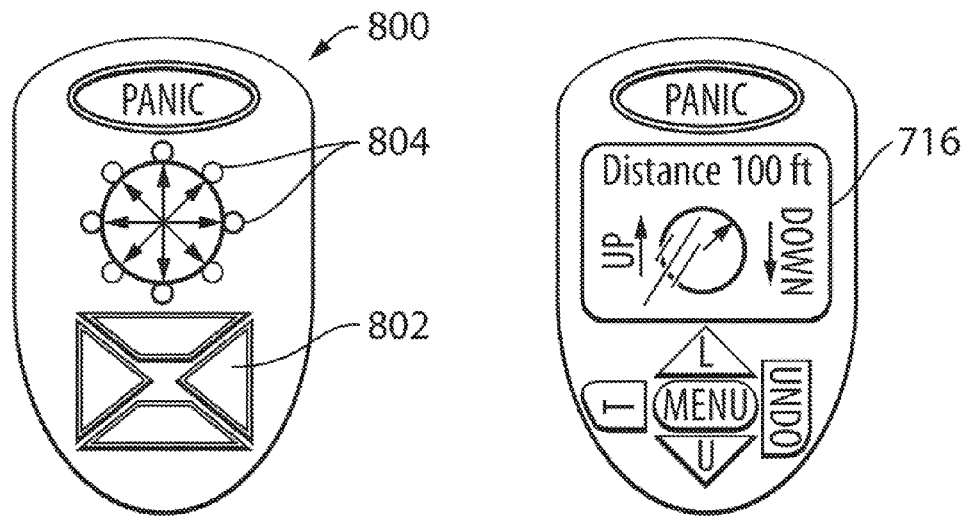
FIG. 9 illustrates one embodiment of a key fob useful with the system of FIG. 1.
FIG. 10 shows another embodiment of a key fob useful with the system of FIG. 1.

In circumstances where a lower cost key fob is desired but the vehicle locator functionality retained, the display screen 716 may be optionally omitted and replaced with a series of small light sources arranged in a closed loop. For example, FIG. 9 shows an alternative key fob 800 which has a number of momentary contact switches 802 providing various predetermined vehicle control commands. The fob 800 also includes a series of, for example, eight light emitting diodes (LEDs) 804 arranged in a circle. The appropriate LED 804 is energized to correspond to the directional bearing output of the vehicle locator function.

Also, while the preferred embodiment utilizes an accelerometer or pedometer to determine the distance $d_r$ that the user/key fob travels, an alternative less expensive albeit likely less accurate means for determining or estimating the travel distance of the user/key fob is based on an algorithm which estimates the travel distance based on a presumed walking speed (typically 3-4 mph). Thus the fob travel distance can be calculated by processor 712 based on such an algorithm. An accelerometer is however, preferred, because it provides additional functions such as waking up the mobile control node from a sleep mode, and it may also be used to obtain the orientation of the mobile control node which is useful for determining compass direction.

In addition to the ability to provide an indication to a user of the range and bearing from mobile control unit 624 to a vehicle containing TP unit 628, it is also contemplated that mobile control unit 624 can optionally be configured to also usefully provide an indication to the user of the height at which the vehicle containing TP unit 628 is located. For example, if the vehicle was parked in a multi-level parking garage, the user may have forgotten which level the vehicle was left on. In this case, an indication of the height of the vehicle can prove useful in assisting in the location of the vehicle.

In embodiments of the present invention where it is desired to provide an indication of the height of the vehicle, TP unit 628 can function in response to inputs from electronic compass 652, three-axis accelerometer 656 and/or an inclinometer 660. Specifically, on an ongoing basis, TP unit 628 will monitor changes in the inclination of the vehicle in which it is installed and the speed at which it is moving to determine it change in height. TP unit 628 will calculate and store changes in its height for a selected period of time, for example for the last ten minutes of operation of the vehicle.

In this manner, if the vehicle is driven up two or more levels of a parking garage and then parked, TP unit 628 will have stored in its memory a determination that it has traveled up (or down) some amount equivalent to the inclinations it has measured and the distance it traveled at those inclinations. When mobile control node 624 begins communicating with TP unit 628 as part of the vehicle location process discussed above, TP unit 628 can transmit the stored height value, previously determined, to mobile control unit 624 which can then display this height information to the user. Accordingly, display 716 could, for example, indicate that the user's vehicle is located 300 meters away, at a bearing of fort-five degrees and that, at the time the vehicle was parked, it was approximately twenty-five feet above ground. An example display screen for the vehicle locator function is shown in FIG. 10.

Thus, and in accordance with the present invention, the owner of a vehicle when distant from and seeking to locate where his or her vehicle is parked, simply takes out a key-fob (or another personally-carried device such as a cell phone, PDA or the like) and typically initiates a "car locate" function by pressing a suitable button on the key-fob (or by voice activation or by another user-input). Such user-input to initiate the car-locate function is desirable to prolong battery life. Once the car-locate function is initiated, the owner simply begins to walk in any direction and by looking at the likes of an arrow display on the hand-held key-fob (and/or by following audible instructions generated at the key-fob or delivered over a phone connection to a cell phone or the like) changes his or her walking direction by following the displayed arrow or similar instructions until the parked vehicle comes into plain view and is thus located. To achieve this, the owner must begin to walk in any direction he or she chooses and then the combination of the fob travel estimation element (such as provided via an accelerometer or similar pedometer or a walking distance estimating algorithm) and the compass element, that are both included in the hand-held key-fob, with the triangulation techniques described above (preferably based on time of flight calculations) will allow the system determine the distance (at any given step taken by the owner as he or she walks) from where the owner happens to be relative to the car location as well as whether the owner is walking towards or not towards the parked location of the vehicle in question. By providing the likes of an arrow or equivalent indicator at a display on the key fob that points in the direction where the system has determined the vehicle to be parked, the owner can simply change his or her walking direction to essentially "follow-the-arrow-on-the-key-fob-to-the-parked vehicle". This system can be of particular benefit in the likes of car-rental lots where the prospective driver has not himself or herself parked the vehicle to begin with. The system of the present invention can locate a vehicle without need to use potentially expensive components/methods such as GPS systems and the like, and the system of the present invention is particularly beneficial and economic as it preferably uses the same wireless communication link to the vehicle as would otherwise be present for keyless entry and/or remote start of the vehicle. Thus an OEM automaker can economically provide a plurality of features (such as car locate and keyless entry or car locate and remote start and keyless entry) using common transmit/receive hardware. The system will detect if the owner is walking towards or not towards the parked location after the owner has taken only a few steps (typically less than about 20 steps, more preferably less than about 10 steps, and most preferably less than about 5 steps) and the direction arrow or indicator that guides the key-fob holder to the parked vehicle thus changes rapidly should the person not be walking in a direction towards the parked vehicle (or should the person deviate from the direction towards the parked vehicle).

Power Control

The mobile control node 624 is preferably powered by one or more batteries as discussed above. As a practical matter, it is desirable for the battery(s) to last as long as possible. Towards this end, the preferred embodiment employs to principal power saving techniques in addition to the periodic sleep or low power mode provided by the preferred 802.15.4/Zigbee communication protocol.

First, as the TP Unit 628 and mobile control node 624 are able to provide a high probability estimate as to the physical distance between the two components, the mobile control unit 624 executes an algorithm which varies the signal transmission power in accordance with the range estimate or additionally or alternatively based on received signal strength. In preferred embodiments, the algorithm varies the transmission power from a minimum level to a maximal level in accordance with a power law, such that as the mobile control node uses relatively little battery power when the range is estimate is small and considerably more power when the range is estimate is relatively high.

Second, the transmission power of the mobile control node 624 preferably varies depending on the particular feature set that is activated. For instance, a feature set such as directional location may always operate on peak power to obtain the best possible result. However, other features such as status indications may utilize variable transmission power such as discussed immediately above. In addition, the transmission power may vary depending on the exact point in the process of carrying the steps of a feature set. For example, in steps requiring user input the mobile control node 624 may operate at peak transmission power, whereas in steps which serve only to handshake status information mobile control node 624 may utilize variable transmission power such as discussed immediately above.

In a preferred power saving configuration, where the key fob has a power amplifier (PA) and low noise amplifier (LNA) as may be embedded in RF controller 708 (FIG. 3A), the PA is used only when transmitting and the LNA is used only when receiving. In order to save power consumption, the LNA is powered (and PA is shut off) only when the key fob is in the receiving mode; likewise the PA is powered (and the LNA is shut off) only when the key fob is in transmitting mode. The same power saving strategy may be used by the TP unit.

The system is preferably always set at a default setting of maximum transmitting power and FEC with most error correction setting to ensure the best performance. When the received RSSI value from the coordinator side indicates that there are more than 20 dB of margin above the noise floor, then the transmit power is scaled down in 3 dB steps by the power amp. When the margin is at 20 dB or less, the transmit power can scale up in 3 dB steps by the power amp. The step scale is set by an analog control voltage fed into the power amp.

Power can also be saved in the digital domain by reducing the length of transmission time and/or the frequencies of retries after receiving bad data. This can be accomplished by deploying different FEC (forward error correction) coding based on RSSI and/or ToF data. When the received signal is strong, the system is less sensitive to error, thus FEC coding with less parity checks is deployed in order to reduce the payload while maintaining same PER (packet error rate), which is equivalent to more efficient coding. When the received signal is weak, FEC coding with more parity checks is deployed thus increasing the payload but reducing the number of retries while maintaining the same PER, which is equivalent to trading coding efficiency for power consumption.

In addition, instead of a long payload per transmission, the payload is divided into several transmissions to ensure the success of each individual transmission, thus reducing the number of retries. When RSSI value reaches within 5 dB of a noise floor, the payload can be reduced on both the TP Unit and the key fob or other end devices.

Security and Authentication

In order to prevent unauthorized use of, or access to, vehicle 630, an appropriate authentication system is employed with TP unit 628 and mobile control node 624. The present invention is not limited to any specific authentication system, and a variety of such systems are commonly employed, but in general a mobile control node 624 must be authenticated to a TP unit 628 with which it is to interact and data transmissions between an authenticated mobile control node 624 and TP unit 628 are encrypted to prevent spoofing or eavesdropping by unauthenticated users.

In the preferred embodiment, the preferred IEEE 802.15.4/Zigbee communication protocol used to communicate between wireless devices incorporates a variety of security modes. In the preferred embodiment, the following security suite is implemented:

access control, in which at least the TP unit 628 is programmed with an access control list that contains the addresses of devices with which communication allowed;

encryption, wherein data is encrypted at the source and decrypted at the destination using the same key;

integrity, where a message integrity code is added to a message, allowing the detection of any tampering of the message by devices without the correct encryption/decryption key; and sequential freshness, where a frame counter is added to a message in order to protect against replay attacks in which old messages are later resent to a device.

In addition to the foregoing, the preferred embodiment also includes a security suite at the application layer of the preferred communication protocol stack. Thus, for example, any additional security schemes employed by automotive original equipment manufacturers (OEMs) can also be implemented to ensure secure communication between the mobile control node 624 and TP unit 628. In particular, additional rolling code algorithms may be employed at the application layer, if desired.

In the preferred embodiment, the TP unit 628 can preferably join other wireless networks such as home security network 160. In this case, the TP unit 628 and the coordinator of the home security network (which will typically be the main security controller) are placed into a programming mode by initiating a pre-defined action such as the user depressing certain keys on the mobile control node 624 and a keypad associated with the home security system within a short period of time of one other. Once in the program mode, an application layer program may then establish a gateway link between the networks (wherein the TP unit 628 presents itself as a separate node in each distinct network), or more preferably, the wireless area network IDs and the channel utilization of both networks are reconfigured, as required, to be the same, in which case the vehicle wireless network 110 forms a subnetwork or tree in the other wireless network. Thereafter, the unique address of the TP unit 628 and/or the unique address of the coordinator are placed on the access control lists of these devices, facilitating future communication between the devices, and no other. In addition, as an application layer security suite, the vehicle ID number (VIN) may be transferred to the coordinator to function as a key to authenticate the vehicle with the home security network. Once the network set up has been established, the TP unit 628 will move with the vehicle and from time to time go out of range with the coordinator, in which case the TP unit 628 will send 'orphan' messages to automatically re-establish communications with the coordinator when the vehicle returns to the vicinity thereof.

In other embodiments, the other wireless area networks may be 'open', allowing any vehicle equipped with a TP unit 628 implementing the preferred communication protocols to join the network on ad hoc basis. In such a case, the host network is preferably programmed to accept any discovery messages transmitted by TP unit 628 and allow it to temporarily join a wireless network associated with the toll gate. An example of such an open system is a toll gate, where the vehicle 630 communicates the YIN number and/or unique address of the TP unit 628 to the tolling infrastructure. Upon receipt of such information, the tolling infrastructure may run a cross-check through vehicle databases to confirm, for example, the license plate of the vehicle, and automatically charge or debit a user account or credit card.

Utilizing such infrastructure, one advantage of the preferred embodiment is that a mobile control node 624 can be authenticated to more that one TP unit 628, and hence to more than one vehicle. Presently, vehicles which are equipped with remote keyless entry (RKE) systems require their users to carry a key fob which has been authenticated to the vehicle. However, as such key fobs can only be authenticated to a single vehicle, users with multiple vehicles must carry multiple key fobs, one for each vehicle. In contrast, in the preferred embodiment mobile control node 624 can be bound or authenticated to two or more vehicles with processor unit 712 storing the appropriate application level authentication values, encryption seed values and/or any other information required to successfully communicate with each vehicle.

A mobile control node 624 can be authenticated, in any appropriate manner, to the TP unit 628 in each vehicle it is wished to control and the corresponding authentication data is stored in memory associated with processor 712. In such a case, the mobile control node 624 can be authenticated to each desired vehicle via any suitable Challenge/Response scheme as will be understood by those of skill in the art. By using a standard communication protocol, such as the above-mentioned IEEE 802.15.4 protocol, appropriate encryption is applied to the Challenge/Response messages exchanged between mobile control node 624 and the TP unit 628 in a vehicle the mobile control node 624 is being authenticated with.

As the mobile control node 624 is authenticated to a TP unit 628 in a specific vehicle, Vehicle VIN data, PCM/ECM ID data, security codes and random number seed values (which were appropriately programmed into TP unit 628 at the time of vehicle assembly) are exchanged with the mobile control node 624 and are stored in an appropriate data structure in mobile control node 624 which is uniquely associated with the specific vehicle.

Similarly, a unique identification code for the mobile control node 624 and/or associated security codes and random number seed values are stored in an appropriate data structure in TP unit 628 associated with that mobile control node 624.

It is contemplated that the authentication between one or more mobile control nodes 624 and a TP unit 628 in a vehicle can be performed during manufacture of the vehicle, can subsequently be performed at a vehicle dealership and/or can be performed by a vehicle purchaser who can implement a set of specific operations to place the system into a secure configuration or programming mode which permits authentication of mobile control nodes 624. In this latter case, the customer can authenticate one or more additional mobile control nodes 624 to a purchased vehicle.

To control a particular pre-authenticated vehicle, a user is either prompted or otherwise initiates the activation of a key, or sequence of keys, on keypad 720 to instruct mobile control node 624 as to which vehicle it is desired to control. Processor 712 will then employ the corresponding authentication values stored in its memory for the selected vehicle to transmit and receive commands to and from the selected vehicle. As will be apparent to those of skill in the art, appropriate prompts for the selection process can be displayed on display 716, if desired.

While at least the security-related commands (PKE and/or RKE related commands) sent from mobile control node 624 to TP unit 628 in a vehicle are preferably encrypted, it is contemplated that all communications between mobile control node 624 and TP unit 628, can be encrypted if desired. In such a case, the encryption employed can be related to the authentication employed for the RKE for the vehicle or the encryption can be any suitable standalone encryption system as will be apparent to those of skill in the art. If mobile control node 624 is authenticated with multiple vehicles, appropriate corresponding encryption keys and/or seeds will be stored in mobile control node 624 for each vehicle.

Advantageously, by having two or more key fobs able to control the vehicle, certain vehicular presets or preferences may be automatically activated depending on which key fob controls the vehicle. Such presets include driver seat position, mirror position, foot pedal position, favourite radio stations, HVAC settings, instrument panel settings and display intensity.

Applications with other Wireless Networks

Figure 11:
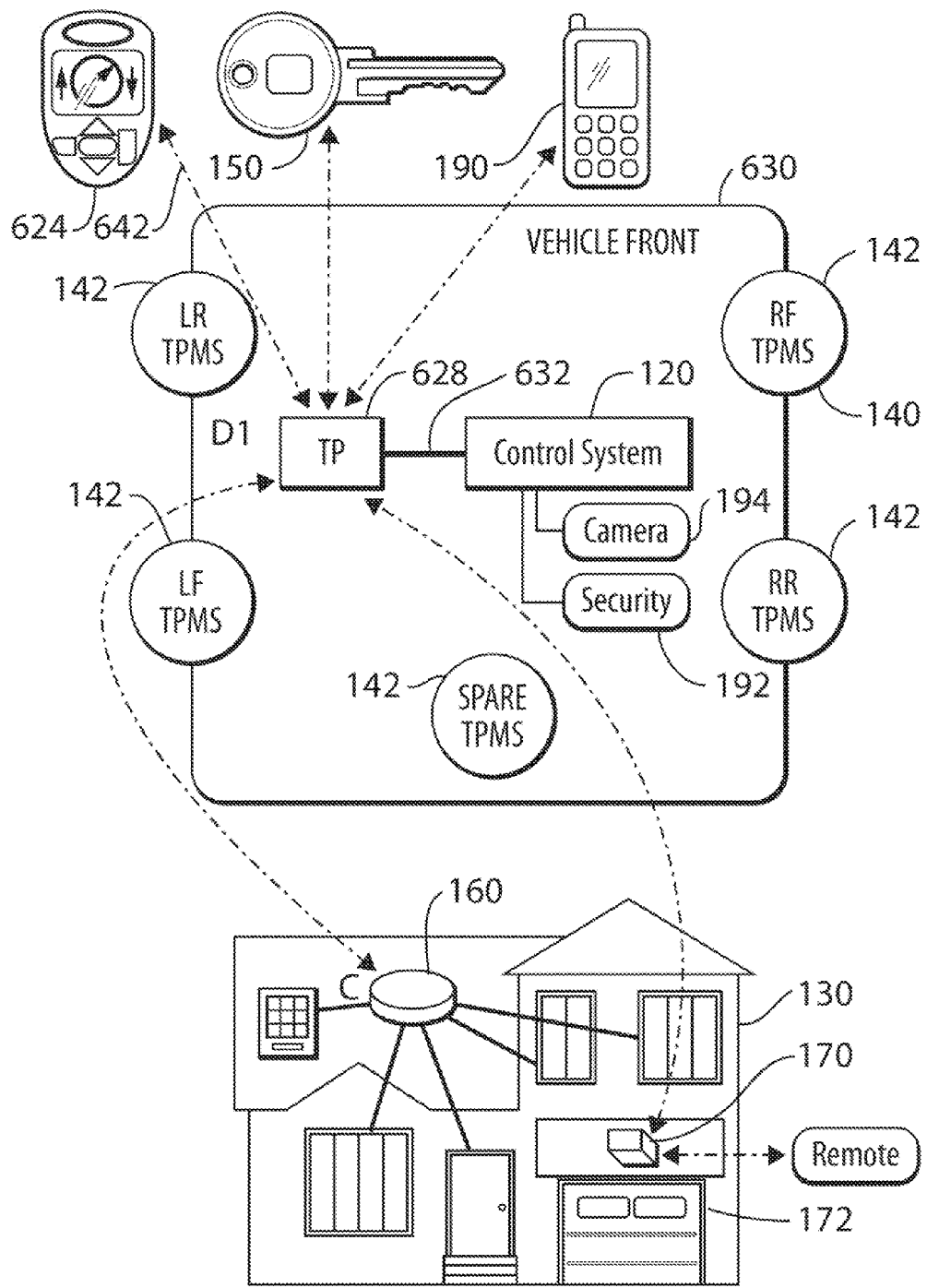
FIG. 11 shows a schematic diagram of another wireless communication system, which includes a cell phone.

A wireless vehicular network that can form connections with other networks has many potential applications. For example, as shown in FIG. 11, the vehicular communication network 110 may include a cell phone 190 (in addition to or as the device providing the function of mobile control node 624) which incorporates an integrated processor/transceiver 154 such as provided by the JN5139. In this case, the cell phone 192 may be used as an output device to report certain vehicle status. For example, in the event an airbag is actuated, or a collision is otherwise detected by a crash sensor, the vehicle control system 120 may send a message to the cell phone 192 via TP unit 628, and in response application software executed by the cell phone may automatically deliver a text message or pre-recorded voice message describing the event to a pre-designated designated e-mail address. Similarly, data such as peak vehicle speeds or GPS destinations may be stored in the vehicle control system, and later downloaded as text messages to either the mobile control node 628 or cell phone 190—a useful feature for enabling parents to monitor their teenagers' behavior.

In another application, a vehicle security system 192 may detect a certain event such as an unauthorized door, hood or trunk opening (e.g., via door switches), unauthorized ignition start (e.g., via central engine computer), glass breakage (e.g., via microphone), or unauthorized movement (e.g., via an accelerometer installed in the vehicle). The vehicle control system security 120 can communicate any such security event information to the remote control node 628. In addition, if the vehicle 630 has a passenger cabin camera 194 as known in the art, for example, to provide an occupancy sensor, the vehicle control system 120 can take one or more pictures or images of the passenger cabin and communicate such images to the mobile control node 628, or cell phone 190, which can also communicate such information to a predetermined recipient. (A suitable camera/occupancy sensor system is described in U.S. Pat. No. 5,877,897; U.S. Pat. No. 6,690,268; and U.S. Pat. No. 6,783,167, the contents of which are each incorporated herein by reference.) It should be appreciated that the first few moments in a vehicle theft can be important as the mobile control node or cell phone may be in range and an image can be captured of the person causing the disturbance. In such an event, the TP unit 628 is preferably operated to transmit at maximum power levels. The image(s) of the interior cabin may also be communicated on demand, in response to an explicit command entered by the user at control node 624.

In the event the vehicle 630 is actively linked with home security network 160, the home security network controller and TP unit 628 preferably exchange frequent 'heartbeat' messages in order to detect the continuous presence of one another. Such messages can be executed synchronously via guaranteed time slot access available in the preferred communication protocol, or asynchronously, via sequential message transfers and countdown timers. The unexpected absence of such messages, for example, by not turning off this function following an authorized starting of the engine, may indicate that the vehicle has been moved without authorization, in which case the home security network may trigger an alarm. Likewise, the vehicle security system may also trigger an alarm if it unexpectedly loses its link with the home security network. Similarly, any of the aforementioned security events detected by the vehicle security system and/or image(s) of the passenger cabin can be communicated to the home security controller via TP unit 628 at any time. So too, an unexpected change in the estimated distance between the vehicle and home security controller, for example, when the home security system is armed to protect the home and vehicle, may also trigger an alarm.

In another application, the vehicle 630 may wirelessly join a dealer or service network so that as a consumer drives up to a service garage or repair shop, the TP unit 628 automatically joins the fixed dealer network. In this case, the vehicle control system can automatically send diagnostic information to the dealer network, eliminating the time and hassle of having to manually hook up a connector to the vehicle control system to read vehicle control codes. Similarly, in manufacturing the vehicle on an OEM assembly line, once the TP unit and vehicle control system are installed in the vehicle, the TP unit may wirelessly interact with an end of line (EOL) tester (before literally reaching the end of the manufacturing line) and provide diagnostic information to the EOL tester, thus reducing manufacturing cycle time.

Optionally, elements of the system of the present invention may be included in interior mirror assemblies, exterior mirror assemblies and/or accessory modules or consoles of the types described in U.S. Pat. Nos. 7,004,593; 6,824,281; 6,690,268; 6,250,148; 6,341,523; 6,593,565; 6,428,172; 6,501,387; 6,329,925; 6,326,613; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; Ser. No. 10/958,087, filed Oct. 4, 2004 by Schofield et al. for VEHICLE ACCESSORY MODULE, now U.S. Pat. No. 7,188,963; and/or Ser. No. 11/201,661, filed Aug. 11, 2005, now U.S. Pat. No. 7,480,149; Ser. No. 10/556,754, filed Nov. 15, 2005, now U.S. Pat. No. 7,289,037; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE and published Aug. 7, 2003 as International Publication No. WO 2003/065084, and/or PCT Application No. PCT/US03/40611, filed Dec. 19, 2003 by Donnelly Corporation for ACCESSORY SYSTEM FOR VEHICLE and published Jul. 15, 2004 as International Publication No. WO 2004/058540, and/or PCT Application No. PCT/US04/15424, filed May 18, 2004 by Donnelly Corporation et al. for MIRROR ASSEMBLY FOR VEHICLE and published Dec. 2, 2004 as International Publication No. WO 2004/103772; and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

The above-described embodiments are intended to be examples of the present invention and alterations and modifications may be effected thereto by those skilled in the art without departing from the scope of the invention.

We claim:

1. A remote vehicle control system, comprising:
   a base data processor and transceiver unit (base TPU) mounted in a vehicle;
   a first substantially omni-directional antenna mounted to the vehicle and operatively coupled to the base TPU;
   a mobile device, the mobile device having a data processor and transceiver unit (mobile TPU), a second antenna connected to the mobile TPU, and a display operatively connected to the mobile TPU;
   wherein the base TPU and mobile device communicate wirelessly with one another via an IEEE 802.15.4 communication protocol and include means for estimating a range therebetween;
   third and fourth antennas mounted to the vehicle that are tuned to communicate over the IEEE 802.15.4 bandwidth used for wirelessly communicating between the base TPU and the mobile device, wherein the third antenna has an operable radiation pattern extending proximate to a driver's side of the vehicle but substantially not to an opposite side thereof and the fourth antenna has an operable radiation pattern extending proximate to the opposite side of the vehicle but substantially not to the driver's side thereof;

wherein the base TPU enables driver or passenger passive keyless entry functions by determining the range between the vehicle to the mobile device by utilizing the first antenna and, in an event such range is less than a threshold distance, detecting a presence of the mobile device proximate to the vehicle driver side or the vehicle opposite side by an ability of the mobile device to communicate via the third and fourth antennas or a quality of such communication.

2. A system according to claim 1, including a switch for selectively connecting the base TPU to any one of the first, third and fourth antennas, and wherein the base TPU attempts to directly communicate with the mobile device via the third and fourth antennas.

3. A system according to claim 2, including at least third and fourth additional TPUs respectively connected to the third and fourth antennas, the additional TPUs being operatively connected to the base TPU and configured to establish wireless communication links with the mobile TPU, and wherein the TPU detects the presence of the mobile device proximate to the vehicle driver side or the vehicle opposite side by the ability of the third and fourth TPUs to establish wireless communication links with the mobile TPU or the quality of such communication links.

4. A system according to claim 3, wherein the mobile TPU, base TPU, third TPU and fourth TPU form a wireless area network, wherein the base TPU functions as a network coordinator and the third and fourth TPUs function as full function nodes.

5. A system according to claim 1, wherein the omni-directional antenna and the third and fourth antennas are mounted in a common housing atop a roof of the vehicle.

6. A system according to claim 1, including an interior rearview mirror assembly having a longitudinal dimension with opposing ends, wherein the third and fourth antennas are mounted at opposing ends of the interior rearview mirror assembly.

7. A system according to claim 1, including exterior rearview mirror assemblies respectively mounted to the driver's side of the vehicle and the opposite side thereof, wherein the third antenna is mounted to the driver side exterior rearview mirror assembly and the fourth antenna is mounted to the opposite side exterior rearview mirror assembly.

8. A system according to claim 1, including a fifth antenna tuned to communicate over the IEEE 802.15.4 bandwidth used for wirelessly communicating between the base TPU and the mobile device, wherein the fifth antenna has an operable radiation pattern extending substantially toward the rear of the vehicle but not to the front or sides thereof, the TPU unlocking a rear vehicular closure member upon detecting the presence of the mobile device proximate to the rear of the vehicle by the ability of the mobile device to communicate via the fifth antenna.

9. A system according to claim 8, including a sixth antenna tuned to communicate over the IEEE 802.15.4 bandwidth used for wirelessly communicating between the base TPU and the mobile device, wherein the sixth antenna has an operable radiation pattern extending substantially within the interior of the vehicle but not external thereto, the TPU enabling a passive start function upon detecting the presence of the mobile device within the interior of the vehicle based on the ability of the mobile device to communicate via the fifth antenna.

10. A remote vehicle control system, comprising:
a base data processor and transceiver unit (base TPU) for mounting in a vehicle;
a first substantially omni-directional antenna mounted to the vehicle and operatively coupled to the base TPU;
a mobile device, the mobile device having a data processor and transceiver unit (mobile TPU), and a second antenna connected to the mobile TPU;
wherein the base TPU and mobile device communicate wirelessly with one another via an IEEE 802.15.4 communication protocol;
third and fourth antennas mounted to the vehicle that are tuned to communicate over the IEEE 802.15.4 bandwidth used for wirelessly communicating between the base TPU and the mobile device, wherein the third antenna has an operable radiation pattern extending proximate to a driver's side of the vehicle but substantially not to an opposite side thereof and the fourth antenna has an operable radiation pattern extending proximate to the opposite side of the vehicle but substantially not to the driver's side thereof;
wherein the base TPU provides driver and passenger passive keyless entry functions by detecting a presence of the mobile device proximate to the vehicle driver side or the vehicle opposite side based on an ability of the mobile device to communicate via the third and fourth antennas or by a quality of such communication.

11. A system according to claim 10, including a switch for selectively connecting the base TPU to any one of the first, third and fourth antennas, and wherein the base TPU attempts to directly communicate with the mobile device via the third and fourth antennas.

12. A system according to claim 10, including at least third and fourth additional TPUs respectively connected to the third and fourth antennas, the additional TPUs being operatively connected to the base TPU and configured to establish wireless communication links with the mobile TPU, and wherein the TPU detects the presence of the mobile device proximate to the vehicle driver side or the vehicle opposite side by the ability of the third and fourth TPUs to establish wireless communication links with the mobile TPU or the quality of such communication links.

13. A system according to claim 12, wherein the mobile TPU, base TPU, third TPU and fourth TPU form a wireless area network, wherein the base TPU functions as a network coordinator and the third and fourth TPUs function as full function nodes.

14. A system according to claim 10, wherein the omni-directional antenna and the third and fourth antennas are mounted in a common housing atop a roof of the vehicle.

15. A system according to claim 10, including an interior rearview mirror assembly having a longitudinal dimension with opposing ends, wherein the third and fourth antennas are mounted at opposing ends of the interior rearview mirror assembly.

16. A system according to claim 10, including exterior rearview mirror assemblies respectively mounted to the driver's side of the vehicle and the opposite side thereof, wherein the third antenna is mounted to the driver side exterior rearview mirror assembly and the fourth antenna is mounted to the opposite side exterior rearview mirror assembly.

17. A system according to claim 10, including a fifth antenna tuned to communicate over the IEEE 802.15.4 bandwidth used for wirelessly communicating between the base TPU and the mobile device, wherein the fifth antenna has an operable radiation pattern extending substantially toward the rear of the vehicle but not to the front or sides thereof, the TPU unlocking a rear vehicular closure member upon detecting the presence of the mobile device proximate to the rear of the vehicle by the ability of the mobile device to communicate via the fifth antenna.

18. A system according to claim 17, including a sixth antenna tuned to communicate over the IEEE 802.15.4 bandwidth used for wirelessly communicating between the base TPU and the mobile device, wherein the sixth antenna has an operable radiation pattern extending substantially within the interior of the vehicle but not external thereto, the TPU enabling a passive start function upon detecting the presence of the mobile device within the interior of the vehicle based on the ability of the mobile device to communicate via the fifth antenna.

* * * * *

UNITED STATES PATENT AND TRADEMARK OFFICE
CERTIFICATE OF CORRECTION

| | | |
|---|---|---|
| PATENT NO. | : 8,319,605 B2 | Page 1 of 1 |
| APPLICATION NO. | : 12/790898 | |
| DATED | : November 27, 2012 | |
| INVENTOR(S) | : Hasib Hassan et al. | |

It is certified that error appears in the above-identified patent and that said Letters Patent is hereby corrected as shown below:

Column 12
Line 59, Insert --,-- after "of"

Column 16
Line 28, "PTA" should be --PIFA--

Column 23
Line 43, "YIN" should be --VIN--

Signed and Sealed this
Fifth Day of March, 2013

Teresa Stanek Rea
*Acting Director of the United States Patent and Trademark Office*